United States Patent
Zhang et al.

(10) Patent No.: US 12,529,622 B2
(45) Date of Patent: Jan. 20, 2026

(54) METHOD AND DEVICE FOR CHARACTERIZING A RESONATOR ELEMENT

(71) Applicant: Max-Planck-Gesellschaft zur Förderung der Wissenschaften e.V., Munich (DE)

(72) Inventors: Shuangyou Zhang, Erlangen (DE); Pascal Del'Haye, Erlangen (DE); Toby Bi, Erlangen (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 19/004,565

(22) Filed: Dec. 30, 2024

(65) Prior Publication Data

US 2025/0172455 A1 May 29, 2025

Related U.S. Application Data

(63) Continuation of application No. PCT/EP2023/068416, filed on Jul. 4, 2023.

(30) Foreign Application Priority Data

Jul. 8, 2022 (LU) .......................... 502482
Jul. 8, 2022 (LU) .......................... 502486

(51) Int. Cl.
    *G01M 11/02* (2006.01)
(52) U.S. Cl.
    CPC ............................... *G01M 11/0207* (2013.01)
(58) Field of Classification Search
    CPC ....... G01J 2003/2866; G01J 2003/2873; G01J 2003/2879; G01J 2003/2886; G01J 3/0218; G01J 3/0297; G01J 3/10; G01J 3/26; G01J 3/28; G01J 1/00; G01J 3/00; G01J 4/00; G01J 5/00; G01J 7/00; G01J 9/00; G01J 11/00
See application file for complete search history.

(56) References Cited

FOREIGN PATENT DOCUMENTS

WO    2020076402 A1    4/2020

OTHER PUBLICATIONS

D. Jones et al., "Carrier-Envelope Phase Control of Femtosecond Mode-Locked Lasers and Direct Optical Frequency Synthesis," Science, vol. 288, No. 5466, pp. 635 to 639, Apr. 2000.
R. Holzwarth et al., "Optical Frequency Synthesizer for Precision Spectroscopy," Physical Review Letters, vol. 85, No. 11, pp. 2264 to 2267, Sep. 2000.
P. Del'Haye et al.: "Frequency comb assisted diode laser spectroscopy for measurement of microcavity dispersion," Nature Photonics, vol. 3, No. 9, pp. 529 to 533, Aug. 2009.
J. Li et al.: "Sideband spectroscopy and dispersion measurement in microactivities," Optics Express, vol. 20, No. 24, pp. 26337 to 26344, Nov. 2012.

(Continued)

*Primary Examiner* — Tri T Ton
(74) *Attorney, Agent, or Firm* — Tautz & Schuhmacher LLC; Michael McCandlish

(57) ABSTRACT

Provided are a method and a device for characterizing a resonator element, a method and a device for providing an optical frequency reference, a LIDAR system and a gas sensing system. The method includes coupling a laser light into the resonator element, the resonator element having multiple carrier resonances for the carrier frequency of the laser light.

15 Claims, 7 Drawing Sheets

(56) References Cited

OTHER PUBLICATIONS

S. Papp et al.: "Parametric seeding of a microresonator optical frequency comb," Optics Express, vol. 21, No. 15, pp. 17615 to 17624, Jul. 2013.
E. Baumann et al. "Comb-calibrated laser ranging for three-dimensional surface profiling with micrometer-level precision at a distance," Optics express, vol. 22, No. 21, pp. 24914 to 24928, Oct. 2014.
G. Rieker et al. "Frequency-comb-based remote sensing of greenhouse gases over kilometer air paths," Optica, vol. 1, No. 5, pp. 290 to 298, Nov. 2014.
V. Brasch et al., "Photonic chip-based optical frequency comb using soliton Cherenkov radiation," Science, vol. 351, No. 6271, pp. 357 to 360, Jan. 2016.
J. Liu et al., "Frequency-comb-assisted broadband precision spectroscopy with cascaded diode lasers," Optics Letters, vol. 41, No. 13, pp. 3134 to 3137, Jul. 2016.
I. Gordon et al., "The HITRAN2016 molecular spectroscopic database," Journal of Quantitative Spectroscopy and Radiative Transfer, vol. 203, pp. 3 to 69, Dec. 2017.
N. Picqueé et al., "Frequency comb spectroscopy," Nature Photonics, vol. 13, No. 3, pp. 146 to 157, Feb. 2019.
A. Rueda et al., "Resonant electro-optic frequency comb", Nature, vol. 568, No. 7752, pp. 378 to 381, Apr. 2019.
M. Zhang et al., "Broadband electro-optic frequency comb generation in a lithium niobate microring resonator", Nature, vol. 568, No. 7752, pp. 373 to 377, Apr. 2019.
S. Viswam, "Advanced laser frequency stabilisation systems for mobile strontium optical lattice clocks," Doctoral Dissertation, pp. 1 to 144, Sep. 2019.
T. Fortier et al., "20 years of developments in optical frequency comb technology and applications," Communications Physics, vol. 2, pp. 1 to 16, Dec. 2019.
A. Frigg et al., "Low loss CMOS-compatible silicon nitride photonics utilizing reactive sputtered thin films," Optics Express, vol. 27, No. 26, pp. 37795 to 37805, Dec. 2019.
M. Takamoto et al., "Test of general relativity by a pair of transportable optical lattice clocks," Nature Photonics, vol. 14, No. 7, pp. 411 to 415, Apr. 2020.
D. Herman et al., "Precise multispecies agricultural gas flux determined using broadband open-path dual-comb spectroscopy," Science Advances, vol. 7, No. 14, pp. 1 to 11, Mar. 2021.
A. Shkarin et al., "Nanoscopic Charge Fluctuations in a Gallium Phosphide Waveguide Measured by Single Molecules," Physical Review Letters, vol. 126, No. 13, pp. 133602-1 to 133602-7, Apr. 2021.
S. Minardi et al., "Astrophotonics: astronomy and modern optics," The Astronomy and Astrophysics Review, vol. 29, No. 1, pp. 1 to 81, Sep. 2021.
Search report issued in LU502486, to which this application claims priority, mailed Feb. 15, 2023.
Search report issued in LU502482, to which this application claims priority, mailed Mar. 1, 2023.
International Search Report and Written Opinion issued in PCT/EP2023/068416, to which this application claims priority, mailed Oct. 11, 2024.
E. Baumann et al., "Comb-calibrated frequency-modulated continuous-wave ladar for absolute distance measurements," Optics letters, vol. 38, No. 12, pp. 2026 to 2028, Jun. 2013.
A. Nishiyama et al., "High resolution molecular spectroscopic system assisted by an optical frequency comb," Journal of the Optical Society of America B, vol. 30, No. 8, pp. 2107 to 2112, Aug. 2013.
A. Nishiyama et al., "Precise frequency measurement and characterization of a continuous scanning single-mode laser with an optical frequency comb," Optics Letters, vol. 39, No. 16, pp. 4923 to 4926, Aug. 2014.
L. Yang et al., "Frequency comb calibrated frequency-sweeping interferometry for absolute group refractive index measurement of air," Applied Optics, vol. 56, No. 11, pp. 3109 to 3115, Apr. 2017.
W. Yu et al. "Comb-calibrated frequency sweeping interferometry for absolute distance and vibration measurement," Optics Letters, vol. 44, No. 20, pp. 5069 to 5072, Oct. 2019.

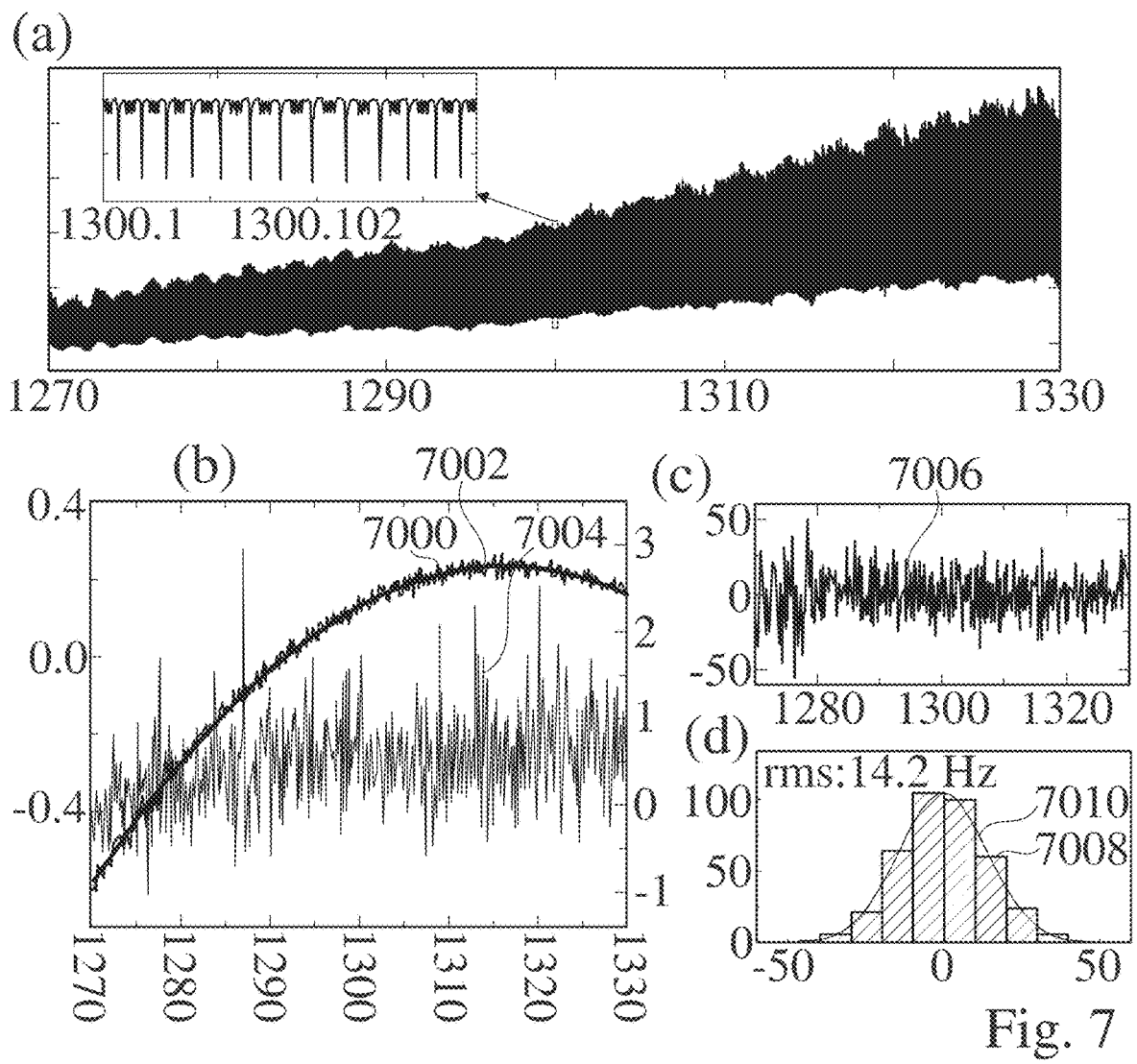
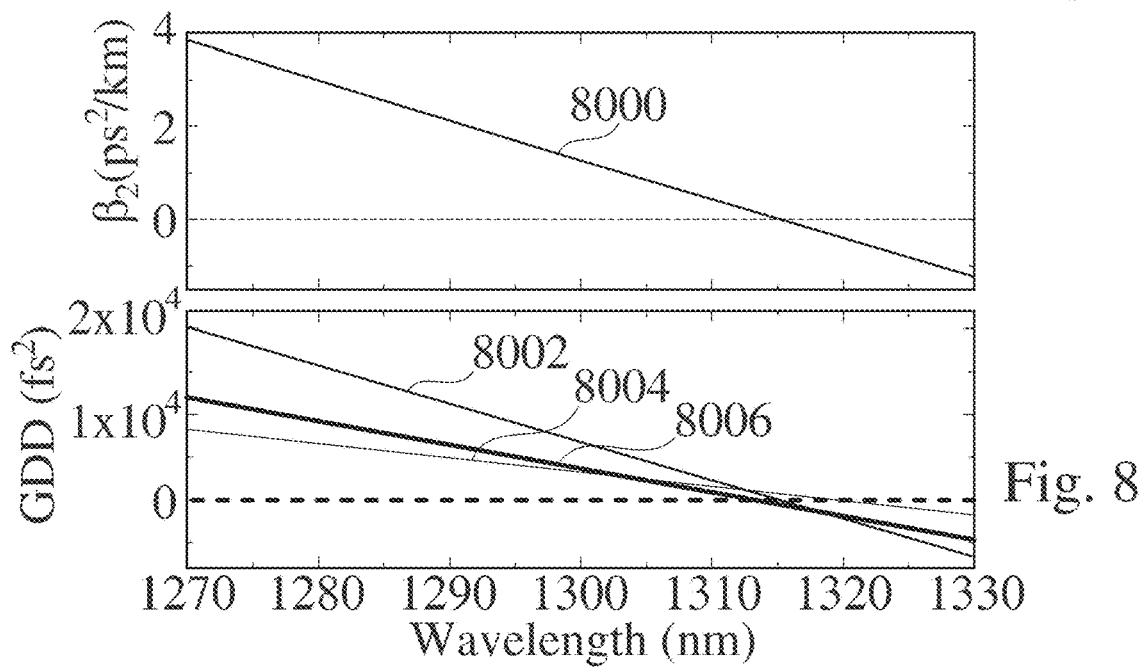
Fig. 7
Fig. 8

METHOD AND DEVICE FOR CHARACTERIZING A RESONATOR ELEMENT

CROSS REFERENCE TO RELATED APPLICATIONS

This application is a continuation application of international patent application PCT/EP2023/068416, filed on Jul. 4, 2023, and designating the U.S., which claims priority to Luxembourgish patent application LU502482, filed on Jul. 8, 2022, and to Luxembourgish patent application LU502486, filed on Jul. 8, 2022, each of which are hereby incorporated by reference in their entireties.

TECHNICAL FIELD

Provided are a method and a device for characterizing a resonator element, a method and a device for providing an optical frequency reference, a LIDAR system and a gas sensing system. The disclosure is, thus, related to techniques for providing optical frequency references.

BACKGROUND

Many applications benefit from the ability to measure time differences and/or spectral differences between multiple signals at high precision. In many applications, optical frequency combs, as described in:

D. J. Jones, S. A. Diddams, J. K. Ranka, A. Stentz, R. S. Windeler, J. L. Hall, and S. T. Cundiff, "Carrier-Envelope Phase Control of Femtosecond Mode-Locked Lasers and Direct Optical Frequency Synthesis," Science 288, 635-639 (2000); and R. Holzwarth, Th. Udem, T. W. Hänsch, J. C. Knight, W. J. Wadsworth, and P. St. J. Russell, "Optical Frequency Synthesizer for Precision Spectroscopy," Phys. Rev. Lett. 85, 2264-2267 (2000);

are used for this purpose. These techniques enable single-frequency metrology with a precision of up to 18 digits, as described in M. Takamoto, I. Ushijima, N. Ohmae, T. Yahagi, K. Kokado, H. Shinkai, and H. Katori, "Test of general relativity by a pair of transportable optical lattice clocks," Nat. Photonics 14, 411-415 (2020).

In addition to single-frequency metrology, optical frequency combs have also been utilized for high-precision and high-speed broadband spectroscopy, benefitting from their unique combination of large bandwidth and high spectral resolution. Within the last two decades, diverse spectroscopic methods based on optical frequency combs have been developed, for example, direct frequency comb spectroscopy, dual-comb spectroscopy, and Fourier transform spectroscopy.

Despite their high precision and widespread use, frequency combs often suffer from a low power per comb line and spectral magnitude fluctuations, which limit their use and pose challenges for their further applications, as explained in T. Fortier and E. Baumann, "20 years of developments in optical frequency comb technology and applications," Commun. Phys. 2, 1-16 (2019).

Moreover, high-precision measurements based on optical frequency combs often require frequency comb light sources with long-term coherence, which involves sophisticated servo loops, as described in N. Picqué and T. W. Hänsch, "Frequency comb spectroscopy," Nat. Photonics 13, 146-157 (2019).

In prior art, often micro resonators are pumped with modulated lasers to generate frequency combs, wherein the central frequency of the laser radiation coupled into the resonator elements is maintained unchanged. The carrier frequencies of the laser radiation coupled into the resonator element are typically stabilized. For generating the frequency combs, often octave-spanning laser radiations spectrally overlapping each other are required, which result in significant technical complexity and costs.

SUMMARY

In one aspect a method for characterizing a resonator element is provided. The method comprises providing a laser light with a tunable carrier frequency and coupling at least a first part of the laser light into the resonator element having multiple carrier resonances for the carrier frequency of the laser light, wherein adjacent carrier resonances are spaced from each other in the spectral domain by a free spectral range. The method further comprises modulating an intensity and/or phase of the part of the laser light coupled into the resonator element with a first modulation frequency and a second modulation frequency for generating for each of the carrier resonances at least two side band resonances spaced by the first modulation frequency from the respective carrier resonance and at least two side band resonances spaced by the second modulation frequency from the respective carrier resonance, wherein the first modulation frequency and the second modulation frequency differ from an integer multiple of the free spectral range and from each other. Moreover, the method comprises tuning the carrier frequency of the laser light with a predetermined tuning rate, measuring an intensity of the laser light transmitted and/or reflected by the resonator element while tuning the carrier frequency, and measuring a tuning time lapsed when tuning the carrier frequency over four adjacent side band resonances, which corresponds to the tuning time required for altering the tunable carrier frequency from a value corresponding to the first of the four side band resonances until reaching the last of the four side band resonances. The method further comprises determining the spacing between multiple carrier resonances in the spectral domain based on the measured intensity of the laser light transmitted and/or reflected by the resonator element using the first modulation frequency, the second modulation frequency and the measured tuning time lapsed when tuning the carrier frequency over four adjacent side band resonances.

In another aspect a device for characterizing a resonator element is provided. The device comprises a tunable laser light source for emitting a laser light having a tunable carrier frequency and a coupling element for coupling at least a part of the laser light into the resonator element. Moreover, the device comprises a modulator for modulating the intensity and/or phase of the part of the laser light coupled into the resonator element at a first modulation frequency for generating for each of the carrier resonances at least two side band resonances spaced by the first modulation frequency from the respective carrier resonance and a second modulation frequency for generating for each of the carrier resonances at least two side band resonances spaced by the second modulation frequency from the respective carrier resonance. Moreover, the device comprises a detector unit for measuring an intensity of a part of the laser light transmitted and/or reflected by the resonator element. The device further comprises a control unit configured to tune the carrier frequency of the laser light, determining a tuning time and determining the spacing between multiple carrier resonances in the spectral domain based on the measured intensity of the laser light transmitted and/or reflected by the resonator element and based on the first modulation frequency, the second modulation frequency and a measured tuning time lapsed when tuning the carrier frequency over four adjacent side band resonances, which corresponds to the tuning time required for altering the tunable carrier frequency from a value corresponding to the first of the four side band resonances until reaching the last of the four side band resonances.

BRIEF DESCRIPTION OF THE DRAWINGS

The disclosure will now be described with reference to the drawings wherein:

FIGS. 7 and 8 illustrate results of a method for characterizing a resonator element according to an optional embodiment.

DESCRIPTION OF FIGURES

Figure 1:
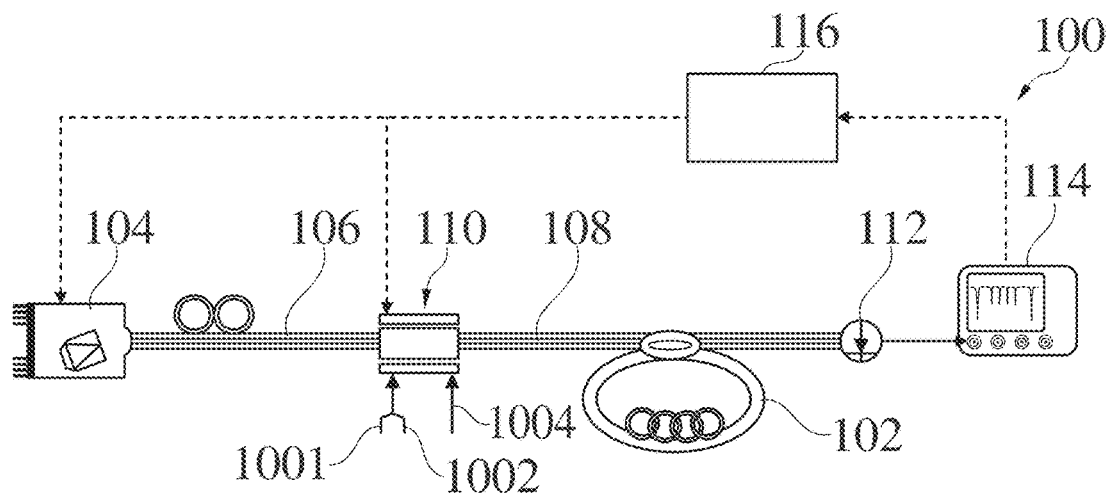
FIG. 1 shows a device for characterizing a resonator element according to an optional embodiment.

In the following, details are set forth to provide a more thorough explanation of the disclosure. However, it will be apparent to those skilled in the art that the disclosure can be practiced without these specific details. In other instances, well-known structures and devices are shown in block diagram form or in a schematic view rather than in detail in order to avoid obscuring the disclosure. In addition, features described hereinafter can be combined with each other, unless specifically noted otherwise. It is also to be understood that other features can be utilized and structural or logical changes can be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers can be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., can be used with reference to the orientation of the figures and/or elements being described. Because the features can be positioned in a number of different orientations, the directional terminology is used for purposes of illustration and is in no way limiting. In some instances, directional terminology can be exchanged with equivalent directional terminology based on the orientation of a feature so long as the general directional relationships between elements, and the general purpose thereof, is maintained.

In the present disclosure, expressions including ordinal numbers, such as "first", "second", and/or the like, can modify various elements. However, such elements are not limited by the above expressions. For example, the above expressions do not limit the sequence and/or importance of the elements. The above expressions are used merely for the purpose of distinguishing an element from the other elements. For example, a first feature and a second feature indicate different features, although both are features. For further example, a first element could be termed a second element, and similarly, a second element could also be termed a first element without departing from the scope of the present disclosure.

In one aspect, a method for providing an optical frequency reference signal for a laser light having a tunable carrier frequency can be provided. The method can comprise providing a resonator element having multiple carrier resonances for the carrier frequency of the laser light, wherein adjacent carrier resonances are spaced from each other in the spectral domain by respective predetermined free spectral ranges. The method can further comprise coupling a first part of the laser light into the resonator element and tuning the carrier frequency of the laser light with a predetermined tuning rate. Moreover, the method can comprise providing a part of the laser light transmitted and/or reflected by the resonator element as a spectrally sweeping optical frequency reference signal, wherein the intensity of the laser light transmitted and/or reflected by the resonator element can have local extrema at frequencies spectrally spaced from each other by the FSR.

In yet another aspect, a use of an optical frequency reference signal provided by a method according to the disclosure as a spectral reference mark can be provided.

In yet another aspect, a method for spectroscopically characterizing an analyte can be provided, wherein the method can comprise providing an optical frequency reference signal using a method according to disclosure, and using the optical frequency reference signal as spectral reference mark for the spectroscopically characterizing the analyte. Using the optical frequency reference signal as spectral reference mark can comprise determining a relative spectral distance of multiple spectral features of the analyte based on one or more FSRs.

In yet another aspect, a device for providing a laser light having a tunable carrier frequency as an optical frequency reference signal can be provided. The device optionally comprises a tunable laser light source for emitting a laser light having a tunable carrier frequency. The device optionally further comprises a resonator element having multiple carrier resonances for the tunable carrier frequency of the laser light, wherein the carrier resonances are spaced from each other in the spectral domain by respective predetermined free spectral ranges, and wherein the device is adapted to couple a part of the laser light into the resonator element. The device optionally further comprises a control unit configured to tune the carrier frequency of the laser light with a predetermined tuning rate. The device can be adapted to provide a part of the laser light transmitted and/or reflected by the resonator element as a spectrally sweeping optical frequency reference signal, wherein the intensity of the laser light transmitted and/or reflected by the resonator element has local extrema at frequencies spectrally spaced from each other by the FSR. Optionally, the device further comprises a detector unit for measuring an intensity of the part of the laser light transmitted and/or reflected by the resonator element. In addition, the device optionally comprises a control unit configured to provide frequencies of the tunable carrier frequency having a local extremum in the measured intensity of the part of the laser light transmitted and/or reflected by the resonator element as spectral reference marks of the optical frequency reference signal defined by the predetermined free spectral ranges.

In yet another aspect, a LIDAR system can be provided. The LIDAR system can comprise a device according to the disclosure for providing an optical frequency reference signal.

In yet another aspect, a gas sensing system can be provided, the gas sensing system can comprise a device according to the disclosure for providing an optical frequency reference signal.

In yet another aspect, a method for characterizing a resonator element can be provided. The method can comprise providing a laser light having a tunable carrier frequency and coupling at least a first part of the laser light into the resonator element having multiple carrier resonances for the carrier frequency of the laser light, wherein adjacent carrier resonances are spaced from each other in the spectral domain by a free spectral range. The method optionally further comprises modulating an intensity and/or phase of the part of the laser light coupled into the resonator element with a first modulation frequency for generating for each of the carrier resonances at least two side band resonances spaced by the first modulation frequency from the respective carrier resonance, wherein the first modulation frequency differs from an integer multiple of the free spectral range. Moreover, the method can comprise tuning the carrier frequency of the laser light with a predetermined tuning rate and measuring an intensity of the laser light transmitted and/or reflected by the resonator element while tuning the carrier frequency. The method can further comprise measuring a tuning time elapsed between multiple carrier resonances separated from each other by at least twice the first modulation frequency. In addition, the method can comprise determining the spacing between multiple free spectral ranges in the spectral domain based on the measured intensity of the laser light transmitted and/or reflected by the resonator element using the first modulation frequency and the measured tuning time elapsed between the multiple carrier resonances separated from each other by at least twice the first modulation frequency.

A laser light having a tunable carrier frequency can be a coherent light having a central frequency which can be tuned by the light source. Tuning the carrier frequency can be considered changing the carrier frequency over time, optionally in a continuous manner. Tuning the carrier frequency can include sweeping the carrier frequency, optionally in a sinusoidal manner.

A resonator element can be an element having specific transmission and/or absorption characteristics for the tunable carrier frequency, wherein for predetermined values of the tunable carrier frequency the resonator element can exhibit local minima and/or maxima of the transmission and/or absorption and/or reflection. Optionally, the resonator element can comprise a resonator cavity fulfilling a resonance condition for specific values of the tunable carrier frequency. These specific values of the carrier frequency can be regarded as carrier resonances. In the case of a resonator cavity, the transmission can have local minima at such frequencies, for which the tunable carrier frequency can exhibit a resonance based on the length of the resonator cavity. Measuring an intensity of the laser light transmitted and/or reflected by the resonator element while tuning the carrier frequency can mean that the intensity and/or power laser light transmitted through and/or reflected by the resonator element is measured while continuously tuning the carrier frequency.

Modulating an intensity and/or phase of the part of the laser light with a first modulation frequency and optionally with a second modulation frequency can mean that the intensity and/or phase of the laser light is periodically altered with the first modulation frequency and optionally with the second modulation frequency. Hence, modulating the intensity of the laser light with the first and optionally with the second modulation frequency can result in a periodic decrease and increase of the intensity following the temporal evolution of the modulation signal having the first and optionally the second modulation frequency. In case of more than one modulation signal with more than one modulation frequency, the modulation can effectively be a superposition of the individual modulation signals. This can be achieved by applying the first modulation frequency and the second modulation frequency via a power combiner. The first modulation frequency and the second modulation frequency can each be higher than the free spectral range of the laser light and the resonator element. Although a first and a second modulation signal having a first and a second modulation frequency, respectively, are explicitly mentioned, it is to be noted that the laser light can be modulated by more than two modulation signals at more than two modulation frequencies. The first modulation frequency and the second modulation frequency can each be in the radio frequency range. Optionally, the first modulation frequency and the second modulation frequency can each be in a range from about 100 MHZ to about 100 GHz. The free spectral range of the resonator element can be chosen not to be less than 1 MHz and not more than 100 GHz.

A modulation depth of an intensity modulation and/or a phase modulation can have a modulation index in a range from about 0.6 to 2.

The side band resonances originating in the modulation of the intensity and/or phase of the laser light can originate in a superposition of the carrier frequency and the one or more modulation frequencies.

The modulation frequencies differing from an integer multiple of the free spectral range and from each other can mean that the modulation frequencies generate side band resonances not fully overlapping with the carrier resonances and not fully overlapping with the respective other side band resonances originating in the respective other modulation frequency.

The tuning time elapsed when tuning the carrier frequency over four adjacent side band resonances can correspond to the tuning time required for altering the tunable carrier frequency from a value corresponding to the first of the four side band resonances until reaching the last of the four side band resonances. However, alternatively, the tuning of the carrier frequency can be carried out in a non-homogeneous but well-defined manner. Moreover, if the temporal distance of the four adjacent sided band resonances is sufficiently small, a detailed knowledge about the tuning characteristics may not be essential. Based on the measured elapsed tuning time, the spectral difference between the first and the last of the side band resonances can be determined.

A tunable laser light source can comprise or consist of a tunable continuous wave laser light source. The tunable laser light source can comprise or consist of a diode laser.

The modulator can comprise or consist of an acousto-optical modulator and/or an electrooptical modulator, and/or can be realized via modulating laser current and/or laser current. The detector unit can comprise one or more photodiodes being sensitive in the tuning range of the laser light having a tunable carrier frequency. Optionally, a modulator can be adapted to modulate the intensity of transmitted laser light and/or a phase of the transmitted laser light.

The control unit can be an electric and/or electronic device, such as a computer, a smartphone, and integrated circuit and/or a tablet computer. The control unit can be connected to the detector unit to receive the data measured by the detector unit. The control unit can further be connected to the tunable light source and can be configured to send instructions to the tunable light source to tune the carrier frequency in a specific manner.

Providing frequencies of the tunable carrier frequency having a local extremum in the measured intensity of the part of the laser light transmitted and/or reflected by the resonator element as spectral reference marks of the optical frequency reference signal defined by predetermined free spectral range can mean specific frequencies showing said local extrema are defined as spectral reference marks. In other words, the resonator element can be used in a manner that its predetermined and well characterized carrier resonances can be used as optical frequency reference values, as their spectral distances can be well determined and characterized by a characterization process according to the disclosure. The well characterized spectral distances between the carrier resonances corresponding to the free spectral ranges and/or the spectral distances between the side band resonances can be provided as optical reference frequencies and, thus, as optical frequency reference signals.

Optionally, the disclosure provides the advantage that an optical frequency reference signal can be provided at a high precision level. Optionally, the disclosure allows providing a highly precise frequency reference signal at low technical effort when compared to conventional techniques for providing frequency reference signals, such as frequency combs. Optionally, the frequency reference signal according to the disclosure can be provided based on standard optical and electronic components which can be available at low financial effort in contrast to conventional frequency combs. Optionally, it can be emphasized that the optical frequency reference signal can be provided according to the disclosure based on a continuous wave laser, such as a diode laser, without having the need of an octave spanning spectrum and nonlinear optical processes, as often required in frequency combs. Optionally, the disclosure can allow providing the optical frequency reference signal with a much lower technical complexity and without the need of expensive components and, thus, can allow providing the optical frequency reference signal at low costs. Moreover, the lower technical complexity of the devices can allow to provide these devices in a smaller size and/or in more compact dimensions and can allow miniaturizing and/or integrating such devices in other compact optical and/or electronic components. Optionally, according to the disclosure a continuous laser can be used, wherein the carrier frequency, i.e. the central frequency of the laser radiation, can be swept over a predetermined spectral range, such as optionally 10 free spectral ranges. The carrier frequency and the tuning rate can be well known during the tuning process such that a predetermined sweep of the carrier frequency can be carried out during the tuning time. Therefore, the disclosure can allow characterizing a resonator element and/or providing a frequency reference signal without the need of using frequency combs or other hardware requiring significantly higher costs and a significantly higher degree of complexity. Hence, optionally it is not required to generate a frequency comb in the resonator element. For spectroscopic applications, the carrier frequency can be tuned over a predetermined tuning range including the desired spectral range for the spectroscopic application.

Hence, the disclosure can provide the advantage that an optical frequency reference signal can be provided at lower technical complexity, in a smaller size and at lower costs than associated with conventional frequency combs. Optionally, instead of requiring octave spanning and spectrally stabilized laser radiations spectrally overlapping each other, it can be sufficient for the methods and devices according to the disclosure to provide a laser light having a tunable carrier frequency and tuning the carrier frequency with a predetermined tuning rate over a predetermined spectral range, such as for instance 10 free spectral ranges. Hence, optionally, the technical complexity and requirements as compared to the prior art can be greatly reduced.

A difference between the first modulation frequency and the second modulation frequency can be chosen not to be less than 10% of a resonance linewidth of the carrier resonances and not more than 50% of the free spectral range. This can ensure a suitable distinguishability of the side band resonances from each other and from the carrier resonances as their spacing in the frequency domain is suitably large.

The first modulation frequency and the second modulation frequency can essentially correspond to a frequency in the vicinity of an $n+\frac{1}{2}$ multiple of the free spectral range, wherein n is an integer number. "In the vicinity" means that the frequency is close to an $n+\frac{1}{2}$ multiple of the free spectral range but not identical to it. Optionally, the first modulation frequency and/or the second modulation frequency can each be spectrally spaced from an $n+\frac{1}{2}$ multiple of the free spectral range between 100 MHz and 100 GHz. Optionally, this can ensure that the side band resonances are spectrally located well between the carrier resonances.

Within at least one free spectral range two side band resonances generated by the first modulation frequency from one of the carrier resonances and at least two side band resonances generated by the second modulation frequency from one of the carrier resonances can be located. This can allow that the spectral spacing of two adjacent carrier resonances and, thus, of the free spectral range can be determined at a high precision by using inter alia the spectral spacing of the first modulation frequency and the second modulation frequency from each other and from the associated carrier frequency.

Measuring the tuning time elapsed when tuning the carrier frequency over four adjacent side band resonances can comprise measuring the tuning time elapsed when tuning the carrier frequency over four adjacent side band resonances located within one single free spectral range. This provides the benefit that the required spectral tuning range for determining the information used for determining the spacing between multiple carrier resonances can be limited to small spectral range. This facilitates maintaining a constant tuning rate of the laser light source in the small spectral range to be covered, and thus reduces or avoids undesired measurement errors when determining the spacing between carrier resonances.

The method for characterizing a resonator element can further comprise a step of coupling a second part of the laser light into a calibration element having predetermined absolute transmission and/or reflection characteristics and measuring an intensity of the part of the laser light transmitted and/or reflected by the calibration element while tuning the carrier frequency. Moreover, the method can comprise the steps of identifying at least one distinct absolute transmission and/or reflection characteristic of the calibration element having a predetermined frequency coinciding with or having a specified offset from one of the carrier resonances or side band resonances in the frequency domain, and calibrating an absolute frequency of at least one of the carrier resonances or side band resonances based on the identified distinct absolute transmission and/or reflection characteristic of the calibration element. Thus, these additional steps based on a calibration element allow to calibrate the spectral frequencies of the carrier resonances and the side band resonances in an absolute manner. While the earlier mentioned steps allow a relative calibration of the carrier resonances and the side band resonances with respect to each other, these additional steps allow an absolute calibration of at least one of the carrier resonances and side band resonances and via the one absolutely calibrated carrier resonance or side band resonance to calibrate all remaining carrier resonances and side band resonances via the relative calibration based on the modulation frequencies. Hence, this method allows an absolute calibration of the resonator element which can then be used for providing an absolute optical frequency reference signal. Accordingly, the device for characterizing a resonator element can further comprise a calibration element having predetermined absolute transmission and/or reflection characteristics, wherein the detector unit is further adapted to measure an intensity of the part of the laser light transmitted and/or reflected by the calibration element while tuning the carrier frequency. The control unit can be further adapted to identify at least one distinct absolute transmission and/or reflection characteristic of the calibration element having a predetermined frequency coinciding with or having a specified offset from one of the carrier resonances or side band resonances in the frequency domain, and to calibrate an absolute frequency of at least one of the carrier resonances or side band resonances based on the identified distinct absolute transmission and/or reflection characteristic of the calibration element.

The calibration element can comprise a gas cell filled with a predetermined gas having at least one distinct absolute transmission and/or reflection characteristic. Using a gas cell provides the advantage that for many gases the absorption characteristics are precisely characterized and well known from literature, such as distinct absorption lines. Hence, the absorption features and consequently the transmission characteristics can be well used as a reference for absolute calibration of the carrier resonances and/or the side band resonances of the resonator element when compared to each other. Alternatively, or additionally, the calibration element can comprise one or more of the following elements: a frequency comb, a wave meter, an element providing an atomic and/or molecular transition line.

The resonator element can comprise a fiber cavity and/or an integrated waveguide resonator, and/or a whispering gallery mode resonator and/or an etalon and/or a Fabry-Pérot resonator. This allows integrating the resonator element in conventional optical and/or electronic setups and devices. Moreover, such resonator elements can allow a miniaturization of the device in order to implement the device into small scale optical and/or electronic setups.

The method for providing an optical frequency reference signal for a laser light having a tunable carrier frequency can further comprise modulating an intensity and/or phase of the first part of the laser light coupled into the resonator element with a first modulation frequency and a second modulation frequency for generating for each of the carrier resonances at least two side band resonances spaced by the first modulation frequency from the respective carrier resonance and at least two side band resonances spaced by the second modulation frequency from the respective carrier resonance, wherein the first modulation frequency and the second modulation frequency differ from an integer multiple of the free spectral range and from each other, and providing the frequencies of the side band resonances as spectral reference marks of the optical frequency reference signal. This reflects a calibration process for characterizing the resonator element, which can be omitted if the provided resonator element is already calibrated and if there is no need for recalibration. However, in some embodiments the method for providing an optical frequency reference signal for a laser light having a tunable carrier frequency can also include a process of calibration and/or re-characterization of the resonator elements. This can allow regularly checking the calibration of the resonator element and by this to ensure and possibly improve the precision of the provided optical frequency reference signal. The involved method for characterizing the resonator element can correspond to the method described further above. Also in this case, the first modulation frequency and the second modulation frequency can each be in the radio frequency range and in particular the first modulation frequency and the second modulation frequency can each be in a range from about 100 MHz to about 10 GHZ. A difference between the first modulation frequency and the second modulation frequency can be chosen not to be less than 10% of a resonance linewidth of a carrier resonance and not more than 50% of the free spectral range. The first modulation frequency and the second modulation frequency essentially correspond to a frequency in the vicinity of an n+½ multiple of the free spectral range, wherein n is an integer number.

Moreover, the method can further comprise an absolute calibration of the provided optical frequency reference signal. This can include coupling a second part of the laser light into a calibration element having predetermined absolute transmission and/or reflection characteristics, and measuring an intensity of the part of the laser light transmitted and/or reflected by the calibration element while tuning the carrier frequency. This can further include identifying at least one distinct absolute transmission and/or reflection characteristic of the calibration element having a predetermined frequency coinciding with or having a specified offset from one of the carrier resonances or side band resonances in the frequency domain, and calibrating the absolute frequency of the carrier resonances and/or side band resonances based on the identified distinct absolute transmission and/or reflection characteristic. By doing so, the method allows a regular absolute re-calibration of the resonator element and, hence, of the provided optical frequency reference signal. The calibration element comprises a gas cell filled with a predetermined gas having at least one distinct absolute transmission and/or reflection characteristic and/or a frequency comb and/or a wavemeter and/or a system providing an atomic transition line.

The carrier frequency of the laser light can be tuned over a spectral range of at least ten free spectral ranges. The tuning of the carrier frequency is carried out according to a predetermined tuning pattern. The predetermined tuning pattern for tuning the carrier frequency comprises sweeping the carrier frequency in a sinusoidal tuning pattern and/or in a sawtooth tuning pattern. This can allow providing the optical frequency reference signal in a fast and reliable manner and/or at low technical complexity and low cost.

The laser light can be a continuous wave laser light. The laser light can have a smaller spectral width than a line width of the resonator element. The laser light can have a typical short-term linewidth of 100 kHz or less within a tuning time and/or measuring time of about 5 µs. This can allow carrying out the measurements at high precision.

Accordingly, the device for providing an optical frequency reference signal for a laser light having a tunable carrier frequency can be adapted to carry out a characterization of the resonator element and/or a relative and/or absolute calibration of the resonator element and the carrier resonances and/or the side band resonances. Thus, the device for providing an optical frequency reference signal for a laser light having a tunable carrier frequency can further comprise a modulator for modulating the intensity and/or phase of the part of the laser light coupled into the resonator element at a first modulation frequency for generating for each of the carrier resonances at least two side band resonances spaced by the first modulation frequency from the respective carrier resonance. The control unit can be further configured to provide frequencies of the tunable carrier frequency having a local extremum in the measured intensity of the part of the laser light transmitted and/or reflected by the resonator element due to a side band resonance as spectral reference marks of the optical frequency reference signal defined by predetermined free spectral ranges and the first modulation frequency. The resonator element can comprise a fiber cavity and/or an integrated waveguide and/or a whispering gallery mode resonator and/or an etalon and/or a Fabry-Pérot resonator. The modulator can comprise an electrooptic intensity and/or phase modulator.

Moreover, the device for providing an optical frequency reference signal for a laser light having a tunable carrier frequency can further comprise a calibration element having predetermined absolute transmission and/or reflection characteristics. The detector unit can further be adapted to measure an intensity of the part of the laser light transmitted and/or reflected by the calibration element while tuning the carrier frequency. The control unit can be further adapted to identify at least one distinct absolute transmission and/or reflection characteristic of the calibration element having a predetermined frequency coinciding or having a specified offset with one of the carrier resonances or side band resonances in the frequency domain, and to calibrate an absolute frequency of at least one of the carrier resonances or side band resonances based on the identified distinct absolute transmission and/or reflection characteristic of the calibration element. This can allow an absolute (re-) calibration of the resonator element and of the optical frequency reference signal. The calibration element can comprise a gas cell filled with a predetermined gas having at least one distinct absolute transmission and/or reflection characteristic and/or a frequency comb and/or a wave meter and/or an element or system providing an atomic and/or molecular transition line.

The tunable laser light source can comprise a tunable continuous wave laser light source. The tunable laser light source can comprise a diode laser. The tunable laser light source can be adapted to emit the tunable laser light with a smaller spectral width than a linewidth of the resonator element.

A LIDAR system comprising a device according to the disclosure for providing an optical frequency reference signal can use the device for providing an optical frequency reference signal for referencing the tunable laser to the optical reference signal provided by the device. In some conventional systems known in prior art, a tunable laser is referenced to a frequency comb in order to aim for high accuracy, high precision and high measurement speed. In this case the frequency comb can provide an optical frequency reference signal. Such devices are described for instance in:

Baumann, Esther, et al. "Comb-calibrated frequency-modulated continuous-wave ladar for absolute distance measurements." Optics letters 38.12 (2013): 2026-2028;

Baumann, Esther, et al. "Comb-calibrated laser ranging for three-dimensional surface profiling with micrometer-level precision at a distance." Optics express 22.21 (2014): 24914-24928; and Yu, Wenhui, et al. "Comb-calibrated frequency sweeping interferometry for absolute distance and vibration measurement." Optics Letters 44.20 (2019): 5069-5072.

However, frequency combs can often come along with the disadvantages of being technically complex, sensitive to environmental influences, and expensive. The LIDAR system according to the disclosure can provide a calibrated resonator element, such as a fiber cavity characterized and/or calibrated according to a method disclosed herein, to provide the optical frequency reference signal. This can allow achieving a high accuracy, a high precision and a high measurement speed and is available, in contrast to frequency combs, at lower costs and at a lower technical complexity than frequency combs. Hence, using a device according to the disclosure for providing an optical frequency reference signal can allow achieving a high precision comparable to frequency combs at a significantly lower technical complexity and at significantly lower costs. Consequently, LIDAR and many other applications can be enabled by the disclosure to offer a high precision level, a low complexity and a high stability also in a lower price segment for which an implementation of a frequency comb would economically not be possible. In a LIDAR device comprising a device for providing a frequency reference signal according to the disclosure, a calibrated resonator element can be sufficient without the need of providing a modulator. However, according to some embodiments, an intensity modulator can be provided, for instance for recalibrating the resonator element.

Likewise, a gas sensing system comprising a device for providing an optical frequency reference signal according to the disclosure can be adapted in a similar manner as a conventional system for frequency based remote sensing of greenhouse gases, as described in:

Nishiyama, Akiko, Daiki Ishikawa, and Masatoshi Misono. "High resolution molecular spectroscopic system assisted by an optical frequency comb." JOSA B 30.8 (2013): 2107-2112;

Rieker, Gregory B., et al. "Frequency-comb-based remote sensing of greenhouse gases over kilometer air paths." Optica 1.5 (2014): 290-298; and Herman, Daniel I., et al. "Precise multispecies agricultural gas flux determined using broadband open-path dual-comb spectroscopy." Science Advances 7.14 (2021): eabe9765.

Also in this case, the frequency comb can be replaced with a device based on a resonator element calibrated according to a method disclosed herein, which can allow achieving a high precision, a high accuracy and a high measurement speed like devices based on frequency combs albeit being available at significantly lower technical complexity, at significantly lower manufacturing costs and with a high robustness.

It is understood by a person skilled in the art that the above-described features and the features in the following description and FIGS. are not only disclosed in the explicitly disclosed embodiments and combinations, but that also other technically feasible combinations as well as the isolated features are comprised by the disclosure. In the following, several optional embodiments and specific examples are described with reference to the FIGS. for illustrating the disclosure without limiting the disclosure to the described embodiments.

FIG. 1 shows a device 100 for characterizing a resonator element 102 according to an optional embodiment. The resonator element 102 is formed as a fiber cavity resonator and represents the device under test which is to be characterized by the device 100.

The device 100 comprises a tunable laser light source 104 for emitting a laser light having a tunable carrier frequency. According to the presented embodiment the output of the laser light source 104 is coupled directly into an optical fiber 106, which is coupled to the resonator element 102. Hence, the optical fiber 106 can act as a coupling element 108 for coupling at least a part of the laser light into the resonator element 102.

Moreover, the device 100 comprises a modulator 110, which can be provided as an electro-optic modulator, for modulating the intensity and/or phase of the part of the laser light coupled into the resonator element 102 at a first modulation frequency 1001 for generating for each of the carrier resonances at least two side band resonances spaced by the first modulation frequency 1001 from the respective carrier resonance and a second modulation frequency 1002 for generating for each of the carrier resonances at least two side band resonances spaced by the second modulation frequency 1002 from the respective carrier resonance. The modulator can be provided as an electro-optical modulator and can be adapted to modulate the intensity of the laser light and alternatively or additionally the phase of the laser light. As a modulation signal, one, two or more modulation signals can be applied to the modulator, such as the first modulation frequency 1001 and the second modulation frequency 1002. However, it is emphasized that according to some optional embodiments only one modulation frequency can be used. The modulation signal applied to the modulator 110 can be a superposition of the first and the second modulation frequencies 1001, 1002. The first and the second modulation frequencies 1001, 1002 can represent a sinusoidal oscillation at the respective modulation frequency. However, according to some optional embodiments the modulation signal(s) can be provided as more complex modulation signals, such as waveforms covering a larger range in the spectral domain and/or as a continuous oscillation deviating from a sinusoidal oscillation, such as a sawtooth-shaped signal. Moreover, a bias voltage 1004 can be applied to the modulator 110, for instance for setting basic transmission properties of the modulator 110.

After the modulator 110, the laser light enters the device under test, i.e. the resonator element 102.

Downstream of the resonator element 102 the device 100 comprises a detector unit 112 for measuring an intensity of a part of the laser light transmitted and/or reflected by the resonator element 102. According to the presented embodiment, the detector unit 112 is adapted to detect the intensity of the laser light transmitted through the resonator element 102. The detector unit 112 can comprise one or more photodiodes sensitive at the carrier frequency of the laser light. The detector unit 112 can further comprise or be connected to a data logger unit 114 for storing and/or visualizing and/or evaluating the output signal provided by the detector unit 112.

In addition, the device 100 comprises a control unit 116 configured to tune the carrier frequency of the laser light, determining a tuning time and determining the spacing between multiple carrier resonances in the spectral domain based on the measured intensity of the laser light transmitted and/or reflected by the resonator element 102 and based on the first modulation frequency 1001, the second modulation frequency 1002 and a measured tuning time lapsed when tuning the carrier frequency over four adjacent side band resonances. The control unit 116 is in communication connection with the detector unit 112 and/or the data logger for retrieving the data measured by the detector unit 112. The control unit 116 is further connected to the laser light source 104 and adapted to control the laser light source 104 for tuning the carrier frequency of the laser light emitted by the laser light source 104. In addition, the control unit 116 is connected to the modulator 110 and can be adapted to provide the modulation signal, such as the first modulation frequency 1001 and the second modulation frequency 1002, to the modulator 110.

By scanning the carrier frequency, i.e. the central wavelength of the laser light, emitted by the laser light source 104, the laser light coupled into the resonator element 102 experiences during the tuning process several carrier resonances in the resonator element 102. For frequency values corresponding to said carrier resonances, a substantial amount of energy of the laser light is stored in the resonator element 102 and, thus, the transmitted intensity through the resonator element 102 is decreased at the frequencies corresponding to the carrier resonances. Accordingly, the carrier resonances can be identified by a local minimum of the transmitted energy detected by detector unit 112. In addition, due to the modulation of the intensity and/or phase of the laser light coupled into the resonator element 102 with the first and the second modulation frequency 1001, 1002, two frequency side bands occur, which will experience corresponding two side band resonances for each modulation frequency at particular frequencies differing from the carrier resonances and which are spaced in the frequency domain from the carrier frequencies by the first and second modulation frequency, 1001, 1002, respectively, as described in more detail further below with reference to FIG. 3.

Based on the tuning time and the spacing between multiple carrier resonances in the spectral domain based on the measured intensity of the laser light transmitted and/or reflected by the resonator element 102 and based on the first modulation frequency 1001, the second modulation frequency 1002 and a measured tuning time elapsed when tuning the carrier frequency over four adjacent side band resonances, the control unit 116 can determine the spectral spacing between the carrier resonances and, thus, the spectral ranges of the resonator element 102. Hence, the device allows to precisely characterize the spectral characteristics of the resonator element 102.

Figure 2:
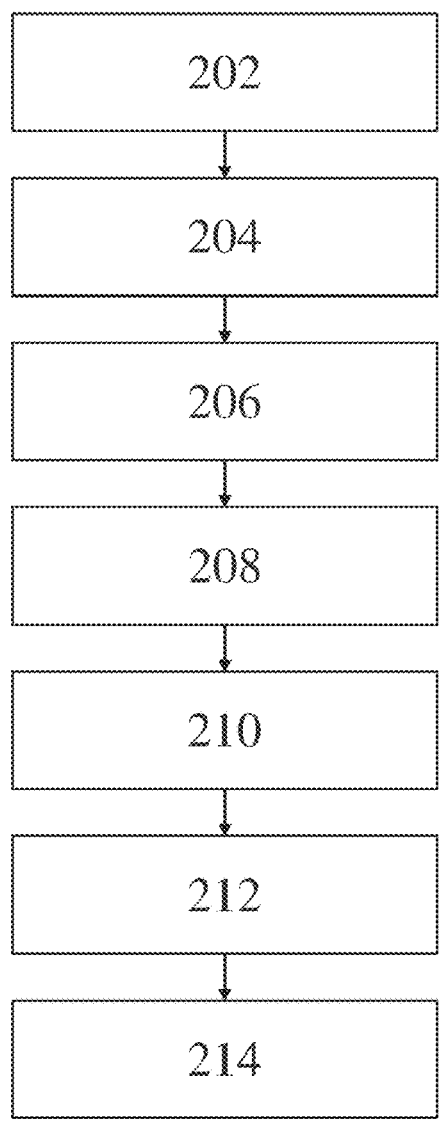
FIG. 2 describes a method for characterizing a resonator element using the device described with reference to FIG. 1.

A method for characterizing a resonator element using the device described with reference to FIG. 1, is explained in the following with reference to FIG. 2.

The method comprises a first step 202 of providing a laser light with a tunable carrier frequency.

Another step 204 comprises coupling at least a first part of the laser light into the resonator element 102 having multiple carrier resonances for the carrier frequency of the laser light, wherein adjacent carrier resonances are spaced from each other in the spectral domain by a free spectral range.

Step 206 comprises modulating an intensity and/or phase of the part of the laser light coupled into the resonator element 102 with a first modulation frequency 1001 and a second modulation frequency 1002 for generating for each of the carrier resonances at least two side band resonances spaced by the first modulation frequency from the respective carrier resonance and at least two side band resonances spaced by the second modulation frequency 1002 from the respective carrier resonance. The first modulation frequency 1001 and the second modulation frequency 1002 differ from an integer multiple of the free spectral range and from each other.

Step 208 comprises tuning the carrier frequency of the laser light with a predetermined tuning rate.

Step 210 comprises measuring an intensity of the laser light transmitted and/or reflected by the resonator element 102 while tuning the carrier frequency.

Step 212 comprises measuring a tuning time lapsed when tuning the carrier frequency over four adjacent side band resonances.

Step 214 comprises determining the spacing between multiple carrier resonances in the spectral domain based on the measured intensity of the laser light transmitted and/or reflected by the resonator element 102 using the first modulation frequency 1001, the second modulation frequency 1002 and the measured tuning time lapsed when tuning the carrier frequency over four adjacent side band resonances.

Figure 3:
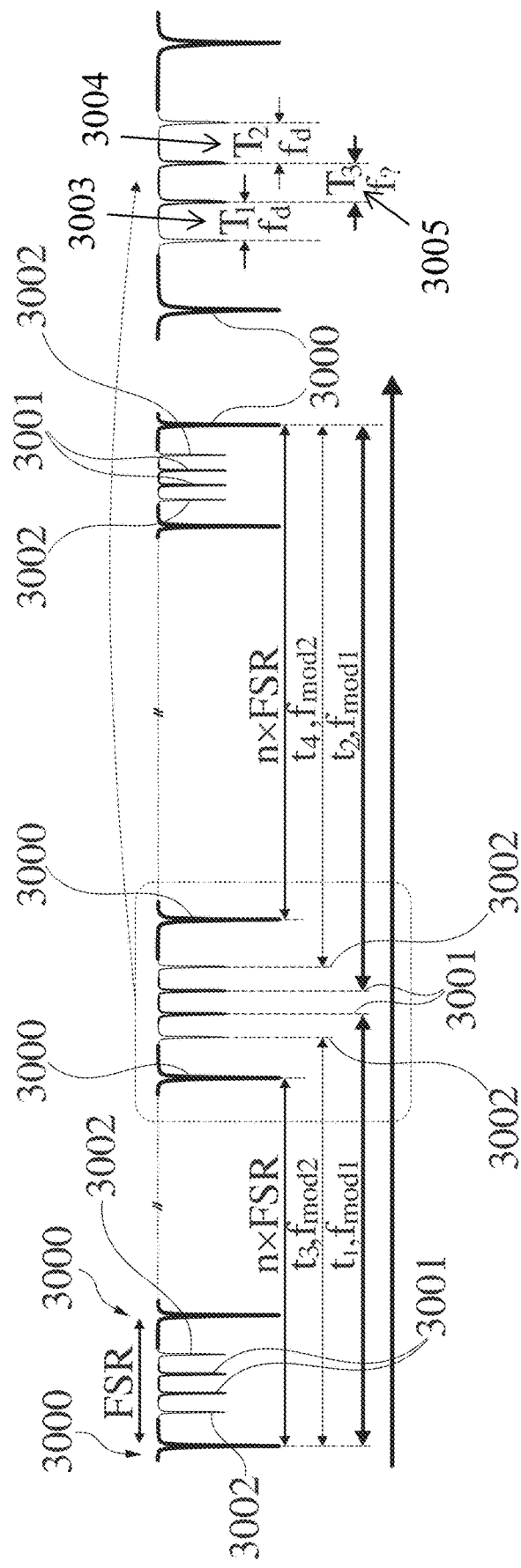
FIG. 3 schematically illustrates carrier resonances and side band resonances.

Due to the modulation of the intensity and/or phase of the laser light with the first modulation frequency 1001 and the second modulation frequency 1002, when tuning the carrier frequency, i.e. scanning the frequency of the laser light source, there are four side band resonances generated within one free spectral range, FSR, between two adjacent carrier resonances in the detected signal, as shown in FIG. 3. Depending on the FSR of the resonator element 102, the two modulation frequencies 1001 and 1002, which are indicated as $f_{mod1}$ and $f_{mod2}$ in FIG. 3, can be set to around $(n+\frac{1}{2}) \times$ FSR, limited by the spectral bandwidth of the modulator, where n is an integer number. The frequency difference fa between the first and the second modulation frequency 1001, 1002 can be set around a few megahertz, depending on the structure linewidth of the resonator element 102.

In FIG. 3, the resonances 3000 represent carrier resonances while the resonances 3001 and 3002 represent the side band resonances arising from the first modulation frequency 1001 $f_{mod1}$ and the second modulation frequency 1002 $f_{mod2}$, respectively. The time interval between the carrier resonance and modulation-side band resonances within one FSR $t_1$ ($t_3$) and $t_2$ ($t_4$) are not necessarily equal due to a possible nonlinear behavior of the frequency scan of the laser light source 104. However, a frequency spacing between these two side band resonances determined by the first or second modulation frequency 1001, 1002 at the frequency $f_{mod1}$ or $f_{mod2}$, respectively, is constant. Assuming the FSR of the resonator element remains constant within the modulation frequency range of $2 \times f_{mod1}$, which can correspond to tens of GHz, the FSR can be calibrated based on the first modulation frequency 1001 $f_{mod1}$, given by $(2n+1) \times FSR = 2f_{mod1} + f_2$ where $f_2$ is the frequency interval between the two adjacent side band resonances 3001 from the same modulation frequency $f_{mod1}$ as shown in FIG. 3.

This leaves the frequency interval $f_2$ as the only uncertain variable due to the nonlinear tunable laser scanning. However, to calculate the FSR, calculating $f_2$ is desired. For a method using only one single modulation frequency $f_{mod1}$, the frequency interval $f_2$ can be calculated based on the average scanning speed of the laser light source 104, taking into account the tuning time $(t_1+t_2)$ and the modulation frequency $(2f_{mod1})$. This allows determining the FSR although to some degree a frequency uncertainty in $f_2$ remains.

In comparison, for a dual RF modulation scheme using a first modulation frequency 1001 $f_{mod1}$ and a second modulation frequency 1002 $f_{mod2}$, the frequency interval $f_2$ can be determined within a short time scale $T_1+T_2+T_3$, as shown at the right-hand side of FIG. 3, and within a small frequency range of only a few megahertz. Within one FSR, the fixed frequency interval fa between two side band resonances is well defined by the predetermined frequency difference between the first modulation frequency 1001 $f_{mod1}$ and the second frequency $f_{mod2}$. The corresponding time separations are marked with $T_1$ 3003 and $T_2$ 3004 in FIG. 3. As a result, the frequency interval $f_2$ can be calculated by $T_3 \times 2f_d/(T_1+T_2)$. The time interval $T_3$ is indicated with reference symbol 3005. Benefiting from the flexibility of the first and the second modulation frequency 1001, 1002, the fixed frequency interval fa between two side band resonances originating in different modulation frequencies 1001, 1002 and the time interval $T_3$ can be set to significantly small values relative to the FSR and a cavity round-trip time of the resonator element 102. Therefore, the uncertainty of the frequency interval $f_2$ can be efficiently reduced. In addition, we can extend the applications of our method for characterizing quasi-periodic devices with an FSR being larger than the first and the second modulation frequency or to non-quasi-periodic devices by using a low-FSR resonator element calibrated by dual RF modulation using a first and a second modulation frequency 1001, 1002. Hence, the method allows for characterizing the resonator element 102 by determining spectral spacing of the carrier resonances and, thus, the free spectral range at high precision. This allows using the resonator element for providing an optical frequency reference signal for a laser light having a tunable carrier frequency. It is emphasized that according to the presented method it can be sufficient to measure the tuning time elapsed when tuning the carrier frequency over the four adjacent side band resonances extending over the time interval $T_1+T_2+T_3$ as indicated with the reference symbols 3003, 3004, and 3005.

Figure 4:
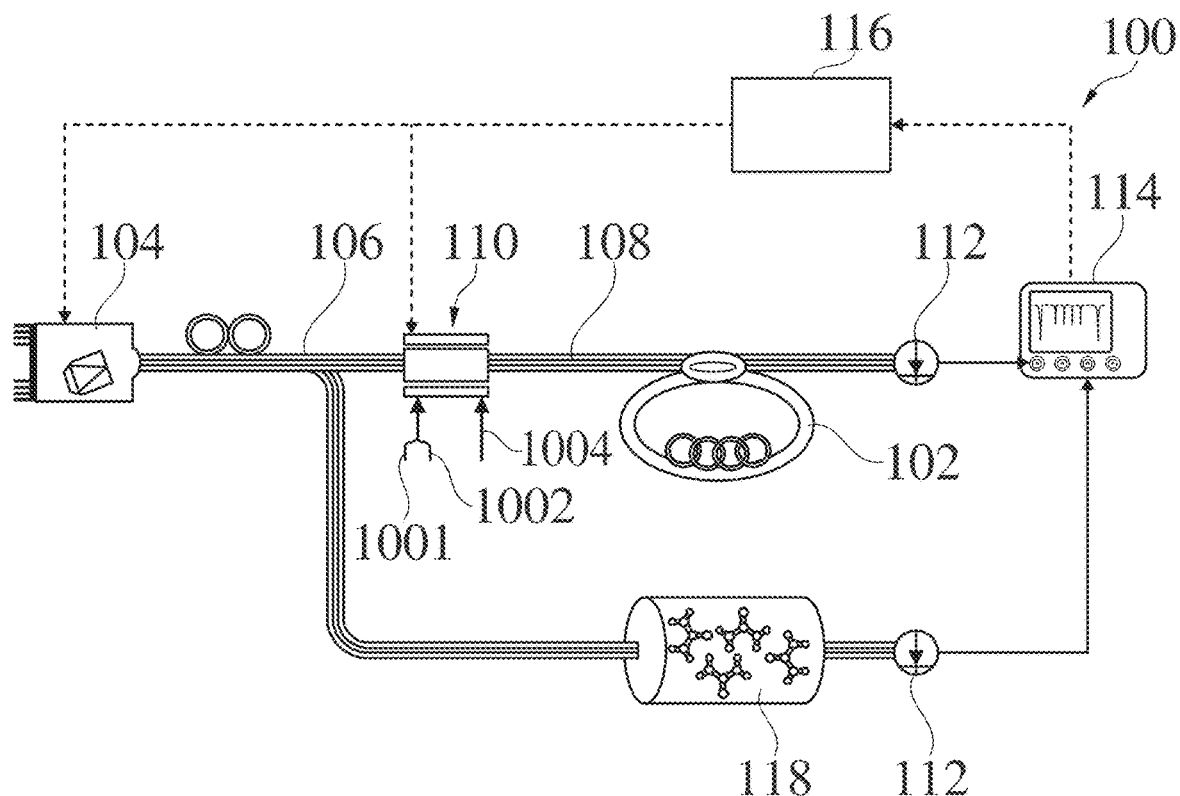
FIG. 4 shows a device according to an optional embodiment for characterizing a resonator element.

FIG. 4 shows a device 100 according to an optional embodiment for characterizing a resonator element 102 which is based on the device 100 described with reference to FIG. 1. The device according to the optional embodiment presented in FIG. 4 deviates from the device of FIG. 1 in having in addition a calibration element 118. The calibration element 118 has predetermined absolute transmission and/or reflection characteristics, such as a predetermined absorption spectrum comprising precisely predetermined absorption lines. Moreover, the detector unit 112 is further adapted to measure an intensity of the part of the laser light transmitted and/or reflected by the calibration element 118 while tuning the carrier frequency. For this purpose, the detector unit 112 can comprise a second photodiode 112 measuring the intensity of the laser light transmitted through the calibration element 118, wherein the measured signal of the second photodiode 112 is provided to the data logger 114 and is evaluated by the control unit 116. The control unit 116 is further adapted to identify at least one distinct absolute transmission and/or reflection characteristic of the calibration element 118 having a predetermined frequency coinciding with or having a specified offset from one of the carrier resonances or side band resonances in the frequency domain, and to calibrate an absolute frequency of at least one of the carrier resonances 3000 or side band resonances 3001, 3002 based on the identified distinct absolute transmission and/or reflection characteristic of the calibration element 118. According to the presented embodiment, the calibration element 118 comprises a gas cell containing a gas having precisely predetermined transmission and/or reflection characteristics, such as precisely determined absorption lines. This allows providing an absolute calibration of the spectral characteristics of the resonator element 102, as the carrier resonances 3000, the side band resonances 3001, 3002 and the free spectral ranges can be referenced to a transmission and/or reflection characteristic of the calibration element being absolutely determined. Hence, the resonator element 102 can be precisely characterized in order to provide an absolute optical frequency reference signal.

Figure 5:
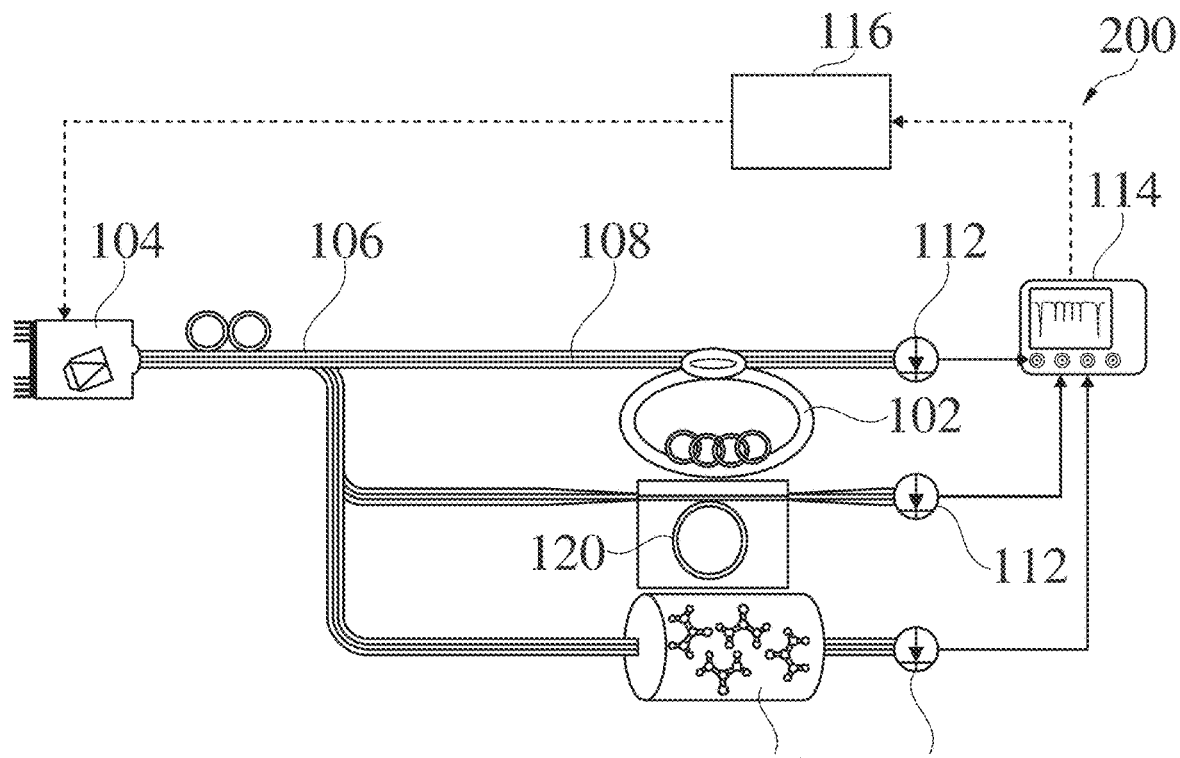
FIG. 5 depicts a device for providing an optical frequency reference signal for a laser light having a tunable carrier frequency.

FIG. 5 depicts a device 200 for providing an optical frequency reference signal for a laser light having a tunable carrier frequency. Like the devices 100 discussed with reference to the previous figures, the device 200 comprises tunable laser light source 104 for emitting a laser light having a tunable carrier frequency. Moreover, the device 200 comprises a well-characterized resonator element 102 having multiple carrier resonances for the tunable carrier frequency of the laser light, wherein the carrier resonances are spaced from each other in the spectral domain by respective predetermined free spectral ranges FSR, and wherein the device is adapted to couple a part of the laser light into the resonator element 102. Moreover, the device 200 comprises a detector unit 112 for measuring an intensity of the part of the laser light transmitted and/or reflected by the resonator element 102 and a control unit 116 configured to provide frequencies of the tunable carrier frequency having a local extremum in the measured intensity of the part of the laser light transmitted and/or reflected by the resonator element 102 as spectral reference marks of the optical frequency reference signal defined by the predetermined free spectral ranges. The device 200 further comprises a calibration element 118, as explained with reference to FIG. 4. In contrast to the devices and methods presented with reference to FIGS. 1 and 4, using a well-characterized resonator element 102 for providing an optical frequency reference signal does not necessarily require a modulator 110, as a well-characterized resonator element can be used whose spectral characteristics can have been determined by applying a method according to the disclosure. However, according to different embodiments the device for providing an optical frequency reference can comprise in addition a modulator, which can allow re-calibrating the resonator element 102 if needed.

According to the embodiment presented in FIG. 5 the resonator element 102 is used for providing an optical frequency reference signal for a further application. The further application can for example comprise a spectral characterization of a photonic device 120, as exemplarily shown as a micro ring resonator 120. Due to the provided optical frequency reference and the optional calibration element 118, the spectral characteristics, such as resonance frequencies, of the photonic devices 120 can be relatively and optionally also absolutely characterized by comparing the measured frequencies with the provided carrier resonances and/or side band resonances of the resonator element 102.

Figure 6:
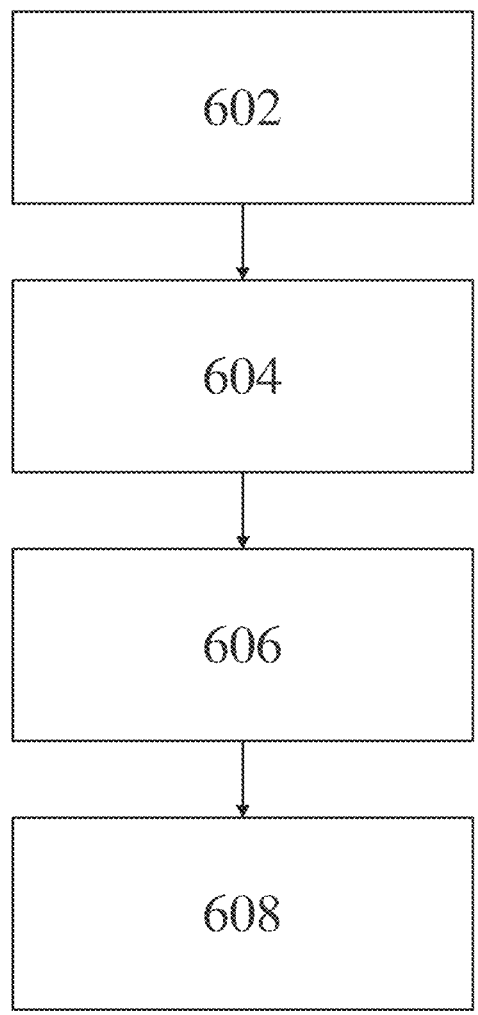
FIG. 6 schematically depicts a method for providing an optical frequency reference signal for a laser light having a tunable carrier frequency.

FIG. 6 schematically depicts a method for providing an optical frequency reference signal for a laser light having a tunable carrier frequency. The method can be carried out using a device discussed with reference to FIG. 5. The method comprises in a step 602 providing a resonator element 102 having multiple carrier resonances 3000 for the carrier frequency of the laser light, wherein adjacent carrier resonances 3000 are spaced from each other in the spectral domain by respective predetermined free spectral ranges FSR. The method comprises in a step 604 coupling a first part of the laser light into the resonator element 102 and in a step 606 measuring an intensity of the part of the laser light transmitted and/or reflected by the resonator element 102. Moreover, the method comprises in a step 608 providing frequencies of the tunable carrier frequency having a local extremum in the measured intensity of the part of the laser light transmitted and/or reflected by the resonator element as spectral reference marks of the optical frequency reference signal defined by predetermined free spectral ranges FSR.

In the following, a detailed example is presented for demonstrating a proof-of-concept without the embodiments or the disclosure being limited to the detailed example.

As a proof-of-concept demonstration, we verify the presented methods and devices by characterizing a resonator element 102 by measuring the optical dispersion of the resonator element 102, which is provided in the form of a fiber cavity. The fiber cavity is made from a 10-dB fiber coupler and 5-m standard telecom fiber (SMF-28) with a zero-dispersion wavelength around 1.310 nm. The free spectral range FSR of the fiber cavity is around 39 MHz, and the mode linewidth is around 1 MHZ, which limits the measurement speed to around 1 THz/s, as described in P. Del'Haye et al.: "Frequency comb assisted diode laser spectroscopy for measurement of microcavity dispersion," Nat. Photonics 3, 529-533 (2009).

To demonstrate the ultrahigh frequency resolution of the method and device according to the disclosure, we use a 1.3-μm tunable laser with a tunable range from 1.270 to 1.330 nm as a laser light source to resolve a small FSR variation around the zero-dispersion wavelength. In the experiment, the tunable laser is modulated by two 20-GHz modulation signals with a 4-MHz frequency difference provided at a first modulation frequency 1001 $f_{mod1}$ and a second modulation frequency 1002 $f_{mod2}$, respectively. The two modulation signals are combined with a power combiner and applied to the EOM serving as a modulator 110. The laser light transmitted through the fiber cavity is detected by a detector unit 112 comprising a photodiode (PD) and an oscilloscope as data logger 114 for recording the measured values with a memory depth of 31.25 million.

FIG. 7 shows in subsection a) the transmission spectrum of the fiber cavity from 1.270 nm to 1.330 nm and the inset presents the zoom-in detail around 1.300 nm. The vertical axis shows the transmission in arbitrary units and the horizontal axis the wavelength in nanometers. The deep transmission dips are fiber cavity resonances experienced by the tuned laser light at the carrier frequency and are referred to as carrier resonances 3000. The four additional small dips within one FSR result from modulation side bands and are, thus, referred to as side band resonances 3001 and 3002. Subsection b) of FIG. 7 shows the measured FSR evolution of the fiber cavity as a function of wavelength around the zero-dispersion regime. The trace 7000 (left axis) in section b) of FIG. 7 shows the results calculated from the dual RF modulation scheme, wherein the left vertical axis indicates the FSR minus an offset of 38.906 MHz and the horizontal axis the wavelength in nanometers. With a sub-15-Hz frequency resolution, the trace 7000 clearly resolves the small FSR variation (<800 Hz) for a range of 11 THz and reveals the complex cavity dispersion of the fiber loop from normal at short wavelengths, crossing zero, and to anomalous dispersion at longer wavelength. The trace 7002 is the second-order polynomial fit with the zero-dispersion wavelength at 1.315 nm. For comparison, the trace 7004 (right axis) in section b) in FIG. 7 shows the calculated FSR evolution based on a measurement using only a single modulation frequency (20 GHz) as a modulation signal, which can not address the small variation of the cavity FSR in as much detail as when using two modulation frequencies. The right vertical axis indicates the FSR minus an offset of 38.906 MHZ (trace 7004). Subsection c) of FIG. 7 shows the frequency difference (trace 7006) of the measured FSRs, as plotted in trace 7000, deviated from the fitted value plotted in trace 7002, wherein the vertical axis indicates the residual in Hz and the horizontal axis indicates the wavelength in nanometers. Subsection d) of FIG. 7 illustrates a histogram 7008, 7010 of the frequency differences based on the trace 7006 in subsection c), and it shows a root-mean-square deviation of 14.2 Hz. These results demonstrate the ultrahigh-frequency resolution of the disclosed dual RF broadband modulation spectroscopy.

Based on the measured results presented in subsection b) of FIG. 7, the upper panel in FIG. 8 shows in trace 8000 the calculated group velocity dispersion $\beta_2$ of the fiber cavity, wherein the horizontal axis indicates the wavelength in nanometers and the vertical axis indicates the group velocity dispersion $\beta_2$ in ps$^2$/km. The results agree well with the dispersion of standard telecom fiber. Trace 8002 in the lower panel of FIG. 8 presents the corresponding group delay dispersion (GDD) of the 5-m fiber cavity, which includes the dispersion from the 10-dB coupler. The vertical axis indicates the group delay dispersion in fs$^2$. By removing 3-m-length fiber out of the cavity, we can measure the GDD of a 2-m fiber cavity (trace 8004 in lower panel) with a zero-dispersion wavelength at 1.318 nm, using the dual RF modulation scheme. By subtracting the GDD of the 2-m fiber cavity from that of the 5-m cavity, we can get the GDD of a 3-m fiber, which is plotted in trace 8006 in the lower panel of FIG. 8 with a zero-dispersion wavelength at 1.312 nm. Trace 8006 indicates the difference between traces 8002 and 8004. From the measurements, we can see that zero-dispersion wavelength of the fiber cavity with longer fiber length approaches to that of a fiber. This demonstration proves that the disclosed methods can be used to characterize the optical properties of individual devices, such as dispersion-engineered broadband mirrors and integrated photonic devices.

The results presented above demonstrate the ultrahigh-frequency resolution of the dual RF modulation scheme according to the disclosed methods for a low-FSR (FSR<modulation frequencies) quasi-periodic structure. In the following, we extend the application of the disclosed method to measure a mode spectrum of a high-FSR (FSR>modulation frequencies) devices, such as optical micro resonators based on a device as illustrated in FIG. 5. For this measurement, we use the fiber cavity as a resonator element for providing carrier resonances of the 5-m fiber cavity as frequency markers, i.e. as an optical frequency reference signal, to measure the resonance frequencies of an individually fabricated Si$_3$N$_4$ resonator. The Si$_3$N$_4$ resonator is fabricated from depositing 750-nm Si$_3$N$_4$ thin film on silicon substrate with 3-μm SiO$_2$ layer, through low-temperature reactive sputtering, as disclosed in A. Frigg, et al., "Low loss CMOS-compatible silicon nitride photonics utilizing reactive sputtered thin films," Opt. Express 27, 37795-37805 (2019).

Figure 9:
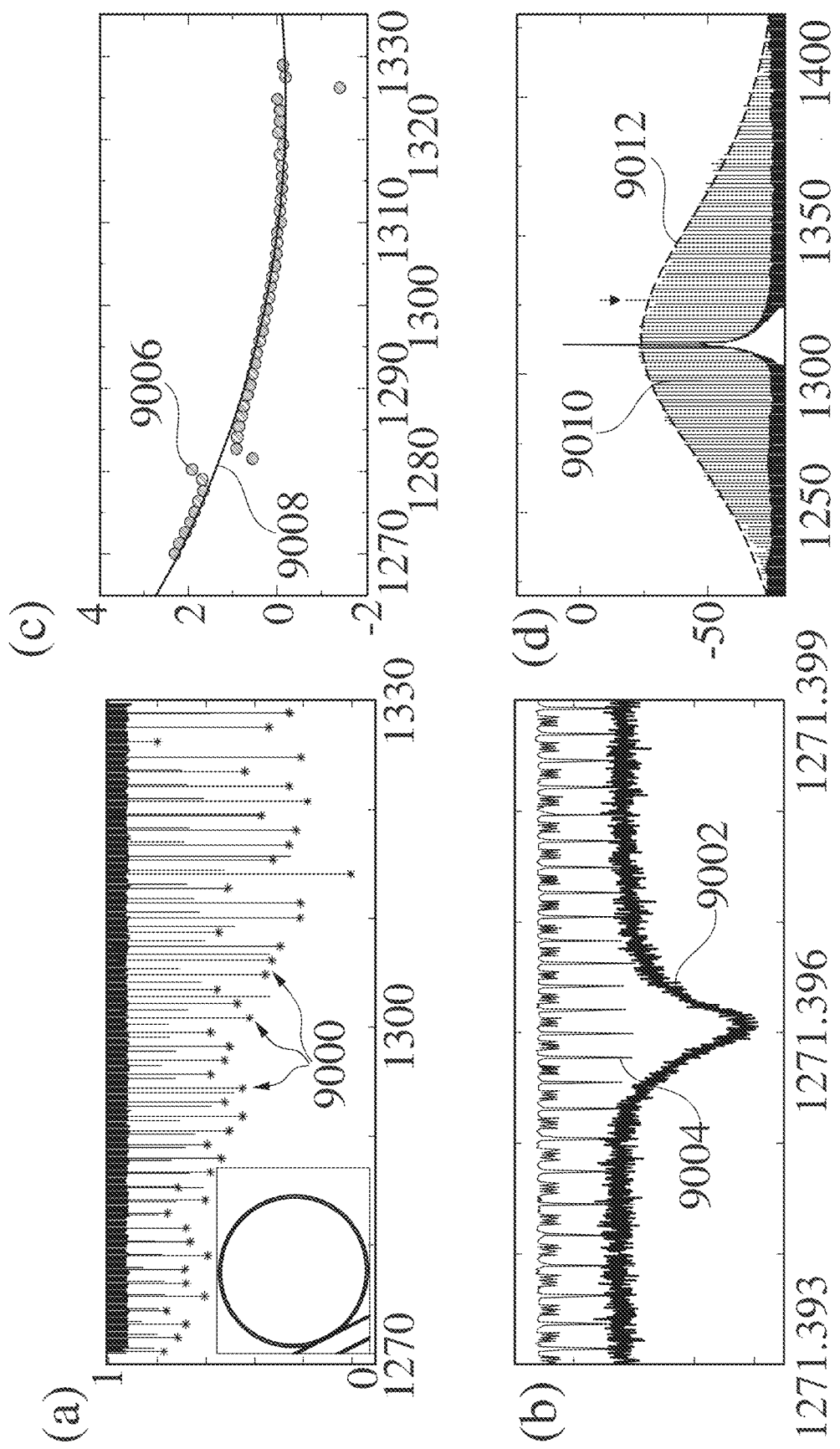
FIG. 9 illustrates results of a method for providing an optical frequency reference signal.

FIG. 9 shows in the inset in subsection a) a scanning electron microscope image of the Si$_3$N$_4$ micro resonator used in the experiments with a 200 μm diameter and waveguide cross-section of 1.8 μm×750 nm. The measured FSR and intrinsic optical quality is ~ 231 GHz and 2 million, respectively. As shown in FIG. 5, part of the laser light keeps the same path as the above experiment, optionally modulated by two modulation frequencies, and injected into the fiber cavity. The transmission signal is detected by a photodiode 112 and recorded by one channel of the oscilloscope 114. Part of the laser light is coupled into and out from the Si$_3$N$_4$ resonator via two lensed fibers, and the transmission spectrum is recorded by another photodiode 112 and another channel of the oscilloscope 114. While scanning the frequency of the CW laser, both transmission signals from the fiber cavity and Si$_3$N$_4$ resonator are simultaneously recorded. FIG. 9 shows in subsection a) the normalized transmission spectrum of the Si$_3$N$_4$ resonator. Two different mode families are observed with star-shaped markers 9000 on the mode family with a higher optical quality factor. The vertical axis indicates the transmission in arbitrary units and the horizontal axis shows the wavelength in nanometers. Subsection 4(b) of FIG. 9 shows one resonance in trace 9002 around 1.271 nm together with frequency markers 9004 from the fiber cavity. The FSR of the fiber cavity is firstly calculated based on the aforementioned dual RF modulation scheme, and the calculated fiber cavity resonances are used as frequency makers to measure the mode structures of the Si$_3$N$_4$ resonator, such as the evolution of the FSR, resonance linewidth, and dispersion. The vertical axis shows the amplitude in arbitrary units and the horizontal axis shows the wavelength in nanometers.

The resonance frequencies of a mode family in a dispersive resonator can be described in a Taylor series as $$\omega_\mu = \omega_0 + D_1\mu + \frac{D_2}{2!}\mu^2 + \frac{D_3}{3!}\mu^3 + \frac{D_4}{4!}\mu^4 + \ldots$$
$$= \omega_0 + D_1\mu + D_{int}(\mu)$$

where μ is the mode number offset from the center mode at μ=0 and $\omega_\mu$ are the resonance frequencies. $D_1/2\pi$ is the FSR of the resonator element, i.e. the Si$_3$N$_4$ resonator at the center mode (μ=0), and $D_2$, $D_3$, and $D_4$ are coefficients of second-, third-, and fourth-order dispersion, respectively. $D_{int}$ is the integrated dispersion, depicting the deviation of resonance frequencies from the equidistant grid spaced by $D_1$. Subsection c) of FIG. 9 shows the measured integrated dispersion profile in circles 9006 at a center mode of 1.310 nm together with a second-order polynomial fitted curve 9008, based on the resonances with the markers 9000 in subsection a). The vertical axis indicates $D_{int}/2\pi$ in gigahertz and the horizontal axis indicates the wavelength in nanometers. The dispersion profile presents anomalous dispersion with mode crossings at 1.280 and 1.326 nm. To verify the dispersion measurement, we test this Si$_3$N$_4$ resonator for the generation of a soliton frequency comb by pumping an optical mode at 1.310 nm. Subsection d) shows the optical spectrum 9010 of a single bright soliton with a fitted sech$^2$ envelope (dashed trace 9012), which further verifies the anomalous dispersion regime for the pump mode. In addition, the mode crossing at 1.326 nm in subsection c) induces a dispersive wave (marked with an arrow) at 1.326 nm in subsection d).

To further highlight the wide practicality and validity of the disclosed method, we demonstrate the application of the disclosed method in non-periodic structures, such as to resolve the absorption spectra of gas cells. A fiber coupled hydrogen fluoride (H19F) gas cell with 50-Torr pressure and 2.7-cm path is used for this demonstration. Again, the laser light of the 1.3-μm CW laser light source is split into two paths, one part is used to probe the absorption spectroscopy of HF, while in the meantime, the other part modulated with dual RF signals is coupled into the 5-m fiber loop cavity as resonator element to simultaneously calibrate the laser frequency sweeping.

Figure 10:
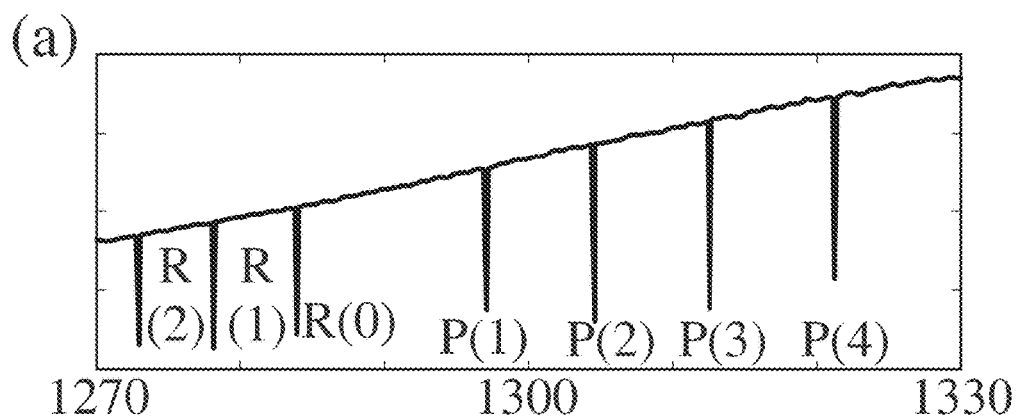
FIG. 10 illustrates results of an absolute calibration using a calibration element.
Figure 10:
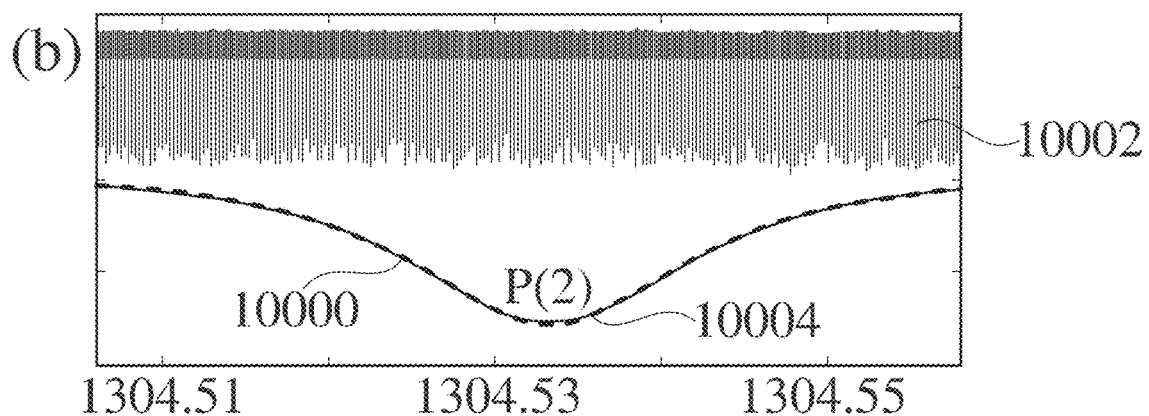

FIG. 10 shows in subsection a) the strong HF molecular absorption lines (P and R branches) in the O-band range, wherein the vertical axis indicates the transmission in arbitrary units and the horizontal axis indicates the wavelength in nanometers. Subsection b) shows the zoomed-in spectrum (trace 10000) of P(2) absorption line with carrier resonances 10002 of the fiber cavity as frequency references. Since the pressure-broadening effect of the HF gas is much larger than its Doppler-broadening effect, a Lorentzian function (dashed line 10004 in subsection b)) is used to fit the spectral profile.

Table 1 shows the measured results of the HF absorption lines in comparison to the HITRAN database (regarding the HITRAN database, see I. E. Gordon et al. "The HITRAN2016 molecular spectroscopic database," J. Quant. Spectrosc. Radiat. Transf. 203, 3-69 (2017))

TABLE 1

| Line | HITRAN[1,2] (nm) | Cal. Gauss. Δf (MHz) | Cal. Lorentz.[2] Δf (MHz) | Measured postion[3] (nm) | Δ (pm) | Measured Lorentz. Δf (MHz) |
|---|---|---|---|---|---|---|
| R(2) | 1272.97025 (±0.04 pm) | 648.8 | 2453.6 (±491.1) | 1272.97025 | — | 3704.1 |
| R(1) | 1278.14783 (±0.04 pm) | 646.2 | 2496.9 (±499.7) | 1278.14748 | −0.35 | 3756.2 |
| R(0) | 1283.88526 (±0.09 pm) | 643.3 | 2260.3 (±452.4) | 1283.88450 | −0.76 | 2909.6 |
| P(1) | 1297.07013 (±0.03 pm) | 636.8 | 2469.3 (±494.2) | 1297.06900 | −1.12 | 3008.6 |
| P(2) | 1304.53367 (±0.04 pm) | 633.1 | 2741.5 (±548.7) | 1304.53276 | −0.91 | 3500.8 |
| P(3) | 1312.59095 (±0.02 pm) | 629.2 | 2650.8 (±530.5) | 1312.59047 | −0.48 | 3168.9 |
| P(4) | 1321.25259 (±0.02 pm) | 625.1 | 2039.4 (±407.9) | 1321.25205 | −0.54 | 2259.3 |

[1]Data from HITRAN are given after the calibration of 50-Torr pressure shift
[2]The uncertainty of the pressure shift and pressure-broadened linewidth are calculated from the pressure uncertainty of 20%
[3]The measured R(2) is set equal to the value from HITRAN The second column of Table 1 shows the absorption line position calculated from HITRAN database, corrected with the pressure shift from the vacuum transition wavelength. Columns 3 and 4 are the calculated Gaussian and Lorentz full width at half-maximum (FWHM), respectively. The uncertainty is calculated based on 20% uncertainty of the gas pressure, specified by the gas cell manufacturer. Column 5 is the measured line positions. Because this demonstration does not provide an absolute frequency reference, the wavelength of the measured R (2) line is set equal to the value calculated from HITRAN database. Column 6 is the wavelength difference between the measured results and the HITRAN database. It can be seen that the measurement agrees excellently with the HITRAN database. This small difference can be attributed to the uncertainty of the gas pressure. Using the calculated Gaussian linewidth in column 3 and Voigt function, the last column shows the measured Lorentz FWHM of different absorption lines. Considering the facts that the wavelength of the measured line positions is smaller than the calculated number in column 2 and the measured Lorentz linewidth is larger than the calculated number, we speculate that the pressure of the HF gas cell used as calibration element in the experiments is higher than 50 Torr specified by the manufacturer.

In conclusion, the disclosure provides and demonstrates a powerful broadband spectroscopy technique based on a tunable CW laser, whose frequency sweeping behavior is calibrated by a fiber cavity with dual RF frequency modulation. With this method, we can resolve a miniscule FSR deviation (800 Hz) of a fiber cavity at close-to-zero dispersion regime over 11-THz frequency range with sub-15-Hz resolution. The demonstrated measurement speed is 1 THz/s, which is limited by the cavity linewidth of the fiber cavity, instead of the measurement systems as in conventional devices (see P. Del'Haye "Frequency comb assisted diode laser spectroscopy for measurement of microcavity dispersion," Nat. Photonics 3, 529-533 (2009)). This can be significantly improved to over 10 THz/s if the resonator element has broader linewidth (>3.2 MHZ). The measurement speed will be ultimately limited by the tuning speed of the laser light source. In addition, the demonstrated method can surpass the strict requirements on the spectral flatness, comb line power, and polarization of conventional spectroscopies based on frequency combs. The measurement spectral range of the disclosed methods is only limited by the tunable range of the CW laser and can be extended by cascading multiple CW lasers, as suggested in J. Liu et al. "Frequency-comb-assisted broadband precision spectroscopy with cascaded diode lasers," Opt. Lett. 41, 3134-3137 (2016), and to the previously unreachable spectral regimes where there are no high-resolution wavelength meters or frequency combs available. We further verified the disclosed method for applications in characterizing the dispersion of integrated photonic devices and the molecular absorption spectrum of HF gas. Using a well-known atomic/molecular transition as an absolute frequency reference, this method can be used for high-precision broadband molecular spectroscopy (see A. Shkarin et al. "Nanoscopic Charge Fluctuations in a Gallium Phosphide Waveguide Measured by Single Molecules," Phys. Rev. Lett. 126, 133602 (2021)). Besides, the disclosed method is ready to be widely applied to different scenarios, such as LIDAR (see E. Baumann et al. "Comb-calibrated frequency-modulated continuous-wave lidar for absolute distance measurements," Opt. Lett. 38, 2026-2028 (2013)), 3D imaging (see E. Baumann et al. "Comb-calibrated laser ranging for three-dimensional surface profiling with micrometer-level precision at a distance," Opt. Express 22, 24914-24928 (2014)), refractive index measurement (see L. Yang et al. "Frequency comb calibrated frequency-sweeping interferometry for absolute group refractive index measurement of air," Appl. Opt. 56, 3109-3115 (2017)), precise frequency measurement and characterization of photonic devices (see V. Brasch et al. "Photonic chip-based optical frequency comb using soliton Cherenkov radiation," Science 351, 357-360 (2016); and A. Nishiyama et al. "Precise frequency measurement and characterization of a continuous scanning single-mode laser with an optical frequency comb," Opt. Lett. 39, 4923-4926 (2014)) such as astrophotonic devices (see S. Minardi, R. J. Harris, and L. Labadie, "Astrophotonics: astronomy and modern optics," Astron. Astrophys. Rev. 29, 6 (2021)).

Figure 11:
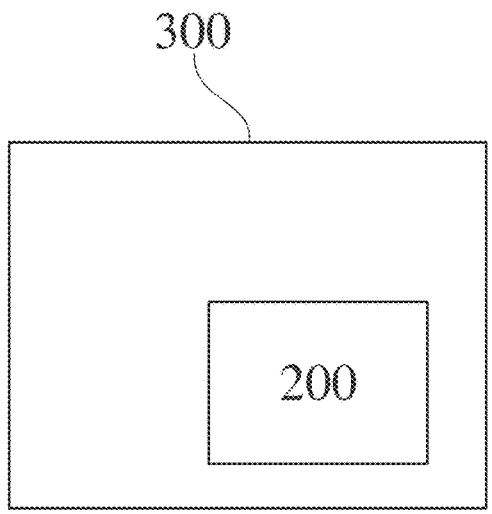
FIG. 11 schematically depicts a LIDAR according to an optional embodiment.
Figure 12:
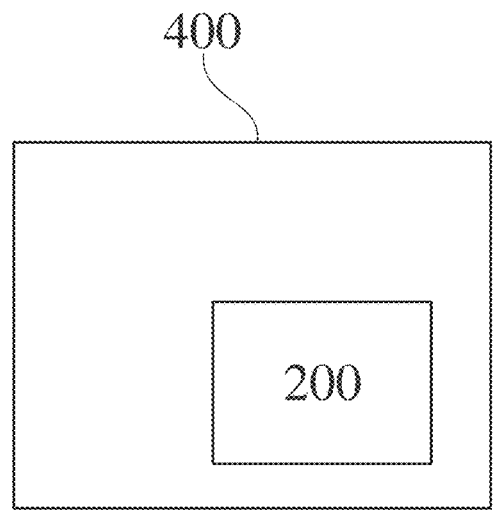
FIG. 12 schematically depicts a gas sensing system according to an optional embodiment.

FIG. 11 schematically depicts a LIDAR system 300 comprising a device 200 for providing an optical frequency reference signal according to an optional embodiment. FIG. 12 schematically depicts a gas sensing system 400 comprising a device 200 for providing an optical frequency reference signal according to an optional embodiment.

LIST OF REFERENCE SYMBOLS

100 device for characterizing a resonator element
102 resonator element
104 laser light source
106 optical fiber
108 coupling element
110 modulator for modulating intensity and/or phase
112 detector unit
114 data logger
116 control unit
118 calibration element
120 photonic device/micro ring resonator
200 device for providing an optical frequency reference signal
202-214 method steps
300 LIDAR system
400 gas sensing system
602-608 method steps
1001 first modulation frequency
1002 second modulation frequency
3000 carrier resonances
3001 side band resonances arising from first modulation frequency
3002 side band resonances arising from second modulation frequency
3003 time separation between side band resonances that are scanned first from the two different modulation frequencies
3004 time separation between side band resonances that are scanned second from the two different modulation frequencies
3005 unknown time interval within neighboring carrier resonances
7000 trace showing results of dual RF modulation scheme
7002 trace showing second order polynomial fit
7004 calculated FSR evolution of single RF modulation scheme
7006 frequency difference of measured FSR from fitted plot
7008, 7010 histogram of frequency difference
8000 calculated group velocity dispersion
8002, 8004, 8006 group delay dispersion for different fiber lengths
9000 mode family with higher optical quality factor
9002 a resonance profile at 1.271 nm
9004 frequency markers
9006 integrated dispersion profile
9008 fitted curve
9010 optical spectrum of a single bright soliton
9012 fitted envelope curve
10000 spectrum of absorption line
10002 carrier resonances
10004 fitted Lorentzian function
FSR free spectral range

What is claimed is:

1. A method for characterizing a resonator element, the method comprising:
providing a laser light with a tunable carrier frequency;
coupling at least a first part of the laser light into the resonator element having multiple carrier resonances for the carrier frequency of the laser light, wherein adjacent carrier resonances are spaced from each other in a spectral domain by a free spectral range;
modulating at least one of an intensity and a phase of the at least first part of the laser light coupled into the resonator element with a first modulation frequency and a second modulation frequency for generating for each of the carrier resonances at least two side band resonances spaced by the first modulation frequency from the respective carrier resonance and at least two side band resonances spaced by the second modulation frequency from the respective carrier resonance, wherein the first modulation frequency and the second modulation frequency differ from an integer multiple of the free spectral range and from each other;
tuning the carrier frequency of the laser light with a predetermined tuning rate, the predetermined tuning rate being a rate at which the carrier frequency of the laser light is changed;
measuring at least one of an intensity of the laser light transmitted and an intensity of the laser light reflected by the resonator element while tuning the carrier frequency;
measuring a tuning time elapsed when tuning the carrier frequency over four adjacent side band resonances, wherein the measured tuning time elapsed when tuning the carrier frequency over four adjacent side band resonances corresponds to a tuning time required for altering the tunable carrier frequency from a value corresponding to a first of the four side band resonances until reaching a last of the four side band resonances; and
determining the spacing between multiple carrier resonances in the spectral domain based on the measured intensity of the laser light transmitted or reflected by the resonator element using the first modulation frequency, the second modulation frequency and the measured tuning time elapsed when tuning the carrier frequency over four adjacent side band resonances.

2. The method according to claim 1, wherein the first modulation frequency and the second modulation frequency are each in a radio frequency range.

3. The method according to claim 1, wherein the first modulation frequency and the second modulation frequency are each in a range from about 100 MHz to about 100 GHz.

4. The method according to claim 1, wherein a difference between the first modulation frequency and the second modulation frequency is not less than 10% of a resonance linewidth of the carrier resonances and not more than 50% of the free spectral range.

5. The method according to claim 1, wherein each of the first modulation frequency and the second modulation frequency correspond to a frequency in a vicinity of an n+½ multiple of the free spectral range, wherein n is an integer number.

6. The method according to claim 1, wherein within at least one free spectral range two side band resonances generated by the first modulation frequency from one of the carrier resonances and at least two side band resonances generated by the second modulation frequency from one of the carrier resonances are located.

7. The method according to claim 1, wherein measuring the tuning time elapsed when tuning the carrier frequency over four adjacent side band resonances comprises measuring the tuning time elapsed when tuning the carrier frequency over four adjacent side band resonances located within one single free spectral range.

8. The method according to claim 1, wherein the free spectral range of the resonator element is not less than 1 MHz and not more than 100 GHz.

9. The method according to claim 1, further comprising:
coupling a second part of the laser light into a calibration element having at least one of predetermined absolute transmission characteristics and predetermined absolute reflection characteristics;
measuring an intensity of at least one of the part of the laser light transmitted and the part of the laser light reflected by the calibration element while tuning the carrier frequency;
identifying at least one of a distinct absolute transmission characteristic and a distinct absolute reflection characteristic of the calibration element having a predetermined frequency coinciding with or having a specified offset from one of the carrier resonances or side band resonances in the frequency domain; and
calibrating an absolute frequency of at least one of the carrier resonances or side band resonances based on the at least one of the identified distinct absolute transmission characteristic and the identified distinct absolute reflection characteristic of the calibration element.

10. The method according to claim 9, wherein the calibration element comprises a gas cell filled with a predetermined gas having at least one of a distinct absolute transmission and a distinct absolute reflection characteristic and one or more of following elements: a frequency comb, a wavemeter, an element providing an atomic and a molecular transition line.

11. A device for characterizing a resonator element, the device comprising:
a tunable laser light source for emitting a laser light having a tunable carrier frequency;
a coupling element for coupling at least a part of the laser light into the resonator element;
a modulator for modulating at least one of an intensity and a phase of a part of the laser light coupled into the resonator element at a first modulation frequency for generating for each of the carrier resonances at least two side band resonances spaced by the first modulation frequency from the respective carrier resonance and a second modulation frequency for generating for each of the carrier resonances at least two side band resonances spaced by the second modulation frequency from the respective carrier resonance;
a detector unit for measuring an intensity of a at least one of a part of the laser light transmitted and a part of the laser light reflected by the resonator element;
a control unit configured to tune the carrier frequency of the laser light, determining a tuning time and determining the spacing between multiple carrier resonances in a spectral domain based on at least one of the measured intensity of the laser light transmitted and the measured intensity of the laser light reflected by the resonator element and based on the first modulation frequency, the second modulation frequency and a measured tuning time elapsed when tuning the carrier frequency over four adjacent side band resonances, wherein the measured tuning time elapsed when tuning the carrier frequency over four adjacent side band resonances corresponds to a tuning time required for altering the tunable carrier frequency from a value corresponding to a first of the four side band resonances until reaching a last of the four side band resonances.

12. The device according to claim 11, wherein the resonator element comprises at least one of a fiber cavity, an integrated waveguide resonator, a whispering gallery mode resonator, an etalon and/er a Fabry-Pérot resonator.

13. The device according to claim 11, wherein the modulator comprises at least one of an electrooptic intensity and a phase modulator.

14. The device according to claim 11, further comprising:
a calibration element having at least one of predetermined absolute transmission characteristics and predetermined absolute reflection characteristics;
wherein the detector unit is further adapted to measure at least one of an intensity of a part of the laser light transmitted and an intensity of a part of the laser light reflected by the calibration element while tuning the carrier frequency; and
wherein the control unit is further adapted to identify at least one of a distinct absolute transmission and a distinct absolute reflection characteristic of the calibration element having a predetermined frequency coinciding with or having a specified offset from one of the carrier resonances or side band resonances in the frequency domain, and to calibrate an absolute frequency of at least one of the carrier resonances or side band resonances based on the at least one of the identified distinct absolute transmission characteristic and and the identified distinct absolute reflection characteristic of the calibration element.

15. The device according to claim 14, wherein the calibration element comprises a gas cell filled with a predetermined gas having at least one distinct absolute transmission, reflection characteristic, a frequency comb, a wave meter, an element providing an atomic, and molecular transition line.

* * * * *